ð US011134378B2

(12) United States Patent
Ding et al.

(10) Patent No.: US 11,134,378 B2
(45) Date of Patent: Sep. 28, 2021

(54) DATA TRANSMISSION METHOD AND APPARATUS

(71) Applicant: Huawei Technologies Co., Ltd., Shenzhen (CN)

(72) Inventors: Zhiming Ding, Shenzhen (CN); Yunbo Han, Shenzhen (CN); Hongcheng Zhuang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 16/631,977

(22) PCT Filed: Oct. 27, 2017

(86) PCT No.: PCT/CN2017/107973
§ 371 (c)(1),
(2) Date: Jan. 17, 2020

(87) PCT Pub. No.: WO2019/015157
PCT Pub. Date: Jan. 24, 2019

(65) Prior Publication Data
US 2020/0169873 A1 May 28, 2020

(30) Foreign Application Priority Data
Jul. 18, 2017 (CN) .......................... 201710586817.5

(51) Int. Cl.
*H04W 12/037* (2021.01)
*H04W 12/06* (2021.01)
*H04W 72/04* (2009.01)

(52) U.S. Cl.
CPC ......... *H04W 12/037* (2021.01); *H04W 12/06* (2013.01); *H04W 72/0413* (2013.01); *H04W 72/0446* (2013.01)

(58) Field of Classification Search
CPC ....... H04L 5/0053; H04L 5/0048; H04L 5/00; H04L 5/0051; H04L 1/0027;
(Continued)

(56) References Cited

U.S. PATENT DOCUMENTS

| 2009/0116434 A1* | 5/2009 | Lohr ..................... H04L 5/0007 370/329 |
| 2015/0223232 A1* | 8/2015 | Eriksson ........... H04W 72/0446 370/329 |

(Continued)

FOREIGN PATENT DOCUMENTS

| CN | 101355818 A | 1/2009 |
| CN | 102045144 A | 5/2011 |

(Continued)

OTHER PUBLICATIONS

R2-164079, LG Electronics Inc, "Support of Semi-Persistent Scheduling for PC5 mode 1," 3GPP TSG-RAN2 Meeting #94, Nanjing, China, Apr. 11-15, 2016, 4 pages.

(Continued)

*Primary Examiner* — Kwasi Karikari
(74) *Attorney, Agent, or Firm* — Conley Rose, P.C.

(57) ABSTRACT

A data transmission method implemented by a network device includes receiving first request information from a first terminal device on a first request transmission resource, where the first request information requests to use a first data transmission resource, and the first data transmission resource belongs to periodic data transmission resources preconfigured by the network device for the first terminal device, sending first authorization response information to the first terminal device on a first authorization transmission resource, where the first authorization response information indicates that the first terminal device is permitted to use the first data transmission resource, and receiving uplink data (Continued)

from the first terminal device on the first data transmission resource.

19 Claims, 7 Drawing Sheets

(58) Field of Classification Search
CPC ......... H04L 5/0044; H04L 1/06; H04L 69/24; H04L 1/1887; H04W 72/0413; H04W 72/042; H04W 74/0833; H04W 72/1284; H04W 72/0446; H04W 72/1268; H04W 72/14; H04W 72/0453; H04W 72/044; H04W 72/10; H04W 74/006; H04W 28/18; H04W 72/005; H04W 28/26; H04W 72/048; H04W 72/08
See application file for complete search history.

(56) References Cited

U.S. PATENT DOCUMENTS

| 2016/0205703 A1* | 7/2016 | Dudda | H04W 72/14 |
| | | | 455/452.1 |
| 2018/0234992 A1 | 8/2018 | Shi et al. | |

FOREIGN PATENT DOCUMENTS

| CN | 102158963 A | 8/2011 |
| CN | 102202414 A | 9/2011 |
| CN | 102316582 A | 1/2012 |
| CN | 105188150 A | 12/2015 |
| KR | 20160056771 A | 5/2016 |
| WO | 2013044985 A1 | 4/2013 |
| WO | 2017070824 A1 | 5/2017 |

OTHER PUBLICATIONS

R1-1708963, Ericsson, "Autonomous UL access for LAA unlicensed cells," 3GPP TSG RAN WG1 Meeting #89, Hangzhou, P.R. China, May 15-19, 2017, 3 pages.

* cited by examiner

DATA TRANSMISSION METHOD AND APPARATUS

CROSS-REFERENCE TO RELATED APPLICATIONS

This application is a U.S. National Stage of International Patent Application No. PCT/CN2017/107973 filed on Oct. 27, 2017, which claims priority to Chinese Patent Application No. 201710586817.5 filed on Jul. 18, 2017. Both of the aforementioned applications are hereby incorporated by reference in their entireties.

TECHNICAL FIELD

This application relates to the communications field, and more specifically, to a data transmission method and apparatus in the communications field.

BACKGROUND

Currently, a scheduling-based transmission mechanism is known. Before transmitting uplink data, a terminal device needs to perform signaling exchange with a network device a plurality of times, and then can obtain a resource used to transmit the uplink data. Specifically, the terminal device first sends scheduling request (Scheduling Request, SR) information to the network device, to inform the network device that the terminal device needs to send data. After receiving the SR information, the network device sends first information to the terminal device. The first information is used to indicate a resource used by the terminal device to send second information, and the second information is used to indicate a size of the data that the terminal device needs to send. The terminal device sends the second information to the network device on the resource indicated by the first information. Further, the network device schedules a resource of a suitable size for the terminal device based on the second information. Then, the network device sends third information to the terminal device, to indicate the resource used when the terminal device sends the data, so that the terminal device transmits, based on the third information, the data on the resource indicated by the third information.

However, in the transmission mechanism, the terminal device needs to perform signaling exchange with the network device four times, and then can transmit the uplink data. Consequently, a relatively large quantity of times of signaling exchange are performed in a data transmission process, and relatively much signaling exchange causes a relatively high latency in the data transmission process.

A fifth generation (5th Generation, 5G) communications system that is currently being formulated needs to support a plurality of services. An ultra-reliable low-latency communication (Ultra Reliable Low Latency Communication, URLLC) service has a relatively high requirement on a latency, and the prior art cannot support a service such as the URLLC service that has a relatively high requirement on the latency.

Therefore, a technology needs to be provided to reduce signaling exchange between the terminal device and the network device, to help reduce or possibly reduce a latency in a data transmission process.

SUMMARY

This application provides a data transmission method and apparatus, to help reduce or possibly reduce a latency in a data transmission process.

According to a first aspect, a data transmission method is provided. The method includes:

receiving, by a network device, first request information that is sent by a first terminal device on a first request transmission resource, where the first request information is used to request to use a first data transmission resource, the first data transmission resource belongs to periodic data transmission resources preconfigured by the network device for the first terminal device, the periodic data transmission resources are used to transmit uplink data, the first request transmission resource belongs to periodic request transmission resources preconfigured by the network device for the first terminal device, and the periodic request transmission resources are used to transmit request information;

sending, by the network device, first authorization response information to the first terminal device on a first authorization transmission resource, where the first authorization response information is used to indicate that the first terminal device can use the first data transmission resource, the first authorization transmission resource belongs to periodic authorization transmission resources preconfigured by the network device for the first terminal device, and the periodic authorization transmission resources are used to transmit authorization response information; and receiving, by the network device, uplink data that is sent by the first terminal device on the first data transmission resource.

Therefore, according to the data transmission method provided in this application, when the first terminal device needs to send the uplink data, the first terminal device sends, to the network device, the first request information used to request the data transmission resource. After the network device receives the first request information, because the network device preconfigures the periodic data transmission resources for the first terminal device, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource. In this way, the first terminal device can directly send the uplink data on the first data transmission resource after receiving the first authorization response information. Compared with the prior art, in this application, the first terminal device can transmit the uplink data through only two times of information exchange. This helps reduce a latency in a data transmission process. This application has better applicability especially to a URLLC service with a relatively high requirement on the latency.

In addition, the network device preconfigures, for the first terminal device, the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

Optionally, the method further includes:

sending, by the network device, first indication information to a second terminal device, where the first indication information is used to indicate a first target transmission resource, and the first target transmission resource includes the periodic data transmission resources and the periodic authorization transmission resources that are preconfigured by the network device for the first terminal device; and receiving, by the network device, uplink data that is sent by the second terminal device on a second data transmission resource, where the second data transmission resource belongs to the periodic data transmission resources preconfigured by the network device for the first terminal device, the second data transmission resource corresponds to a second authorization transmission resource in the periodic authorization transmission resources preconfigured by the network device for the first terminal device, and the network device has not sent the authorization response information on the second authorization transmission resource.

Therefore, the periodic authorization transmission resources and the periodic data transmission resources that are preconfigured by the network device for the first terminal device are informed to another terminal device (for example, the second terminal device) by using the first indication information, so that the second terminal device can detect whether the authorization transmission resource carries the authorization response information, to determine, based on correspondences between the periodic authorization transmission resources and the periodic data transmission resources, whether the second terminal device can use the corresponding data transmission resource. In addition, when detecting that an authorization transmission resource (for example, the second authorization transmission resource) does not carry the authorization response information, the second terminal device may determine that the first terminal device does not use the data transmission resource corresponding to the second authorization transmission resource. In this case, the second terminal device may send its uplink data on the data transmission resource corresponding to the second authorization transmission resource, so that the periodic data transmission resources are fully utilized, and resource utilization is effectively improved.

Optionally, a time segment corresponding to the first request transmission resource belongs to a first time segment, and a time segment corresponding to the first authorization transmission resource belongs to a second time segment;

the receiving, by a network device, first request information that is sent by a first terminal device on a first request transmission resource includes: receiving, by the network device, the first request information that is sent by the first terminal device in the first time segment;

the sending, by the network device, first authorization response information to the first terminal device on a first authorization transmission resource, where the first authorization response information is used to indicate that the first terminal device can use the first data transmission resource includes:

sending, by the network device, the first authorization response information to the first terminal device in the second time segment, where the first authorization response information is used to indicate that the first terminal device can use the first data transmission resource; and the method further includes:

further receiving, by the network device, third request information that is sent by a third terminal device in the first time segment, where the first request information and the third request information are both used to request the first data transmission resource, and periodic data transmission resources preconfigured by the network device for the third terminal device are the same as the periodic data transmission resources preconfigured by the network device for the first terminal device;

sending, by the network device, third authorization response information to the third terminal device in a third time segment to which a time segment corresponding to a third authorization transmission resource belongs, where the third authorization response information is used to indicate that the third terminal device can use a third data transmission resource corresponding to the third authorization transmission resource, the third authorization transmission resource belongs to periodic authorization transmission resources preconfigured by the network device for the third terminal device, and the third data transmission resource belongs to the periodic data transmission resources preconfigured by the network device for the third terminal device; and receiving, by the network device, uplink data that is sent by the third terminal device on the third data transmission resource.

Therefore, when the network device configures the same periodic data transmission resources for the first terminal device and the third terminal device, if the first terminal device and the third terminal device send, in a same time segment, the request information used to request the same data transmission resource, the network device sends the authorization response information to the first terminal device and the third terminal device in different time segments, so that the first terminal device and the third terminal device send the uplink data on different data transmission resources, thereby effectively avoiding a conflict and improving transmission efficiency while saving system resources.

Optionally, after the receiving, by the network device on the first data transmission resource, uplink data sent by the first terminal device, the method further includes:

sending, by the network device, acknowledgement information on a fourth authorization transmission resource in the periodic authorization transmission resources, where the acknowledgement information is used to indicate whether the network device correctly receives the uplink data sent by the first terminal device.

Therefore, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. A system does not need to reconfigure the resource used to transmit the acknowledgement information, thereby effectively improving the resource utilization.

Optionally, the first request transmission resource is a request transmission resource in an $n^{th}$ period of periodic transmission resources preconfigured by the network device for the first terminal device, the first authorization transmission resource is an authorization transmission resource in an $(n+k)^{th}$ period of the periodic transmission resources, the first data transmission resource is a data transmission resource in an $(n+k+t)^{th}$ period of the periodic transmission resources, each period of the periodic transmission resources includes one request transmission resource, one authorization transmission resource, and one data transmission resource, n is an integer greater than 0, and k and t are both integers greater than or equal to 0.

Therefore, three types of transmission resources are configured in each period of the periodic transmission resources, so that when the first terminal device or the network device needs to send signaling (for example, the request information or the authorization response information) or data, it can be effectively ensured that the signaling or the data can be sent in time in each period of the transmission resources. This can further reduce the latency.

Optionally, duration of the period of the periodic transmission resources is one slot.

Therefore, on the basis that the data or the signaling can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce a latency in a communication process.

Optionally, k is 1, and t is 0; or k and t are both 1; or k and t are both 2.

Therefore, k is set to 1 and t is set to 0, or k and t are both set to 1, or k and t are both set to 2, so that the latency in the communication process can be further reduced, and further, a requirement of a low-latency service can be met.

Optionally, before the receiving, by a network device, first request information that is sent by a first terminal device on a first request transmission resource, the method further includes:

receiving, by the network device, transmission latency information sent by the first terminal device;

determining, by the network device based on the transmission latency information, duration of a period of the periodic request transmission resources, duration of a period of the periodic authorization transmission resources, and duration of a period of the periodic data transmission resources.

Optionally, before the receiving, by a network device, first request information that is sent by a first terminal device on a first request transmission resource, the method further includes:

receiving, by the network device, resource-related information sent by the first terminal device, where the resource-related information is used to indicate a maximum value of a size of the uplink data that the first terminal device needs to transmit, or the resource-related information is used to indicate a size of the periodic data transmission resource; and determining, by the network device, the size of the periodic data transmission resource based on the resource-related information.

Optionally, the first request information and the first authorization response information are both one bit.

Therefore, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the first terminal device also only simply parses the first authorization response information to rapidly send the uplink data on the predefined first data transmission resource, thereby further reducing the transmission latency on the whole.

Optionally, the method further includes:

sending, by the network device, second indication information to the first terminal device, where the second indication information is used to indicate a second target transmission resource, and the second target transmission resource includes the periodic request transmission resources, the periodic authorization transmission resources, and the periodic data transmission resources that are preconfigured by the network device for the first terminal device.

According to a second aspect, a data transmission method is provided. The method includes:

sending, by a first terminal device, first request information to a network device on a first request transmission resource, where the first request information is used to request to use a first data transmission resource, the first data transmission resource belongs to periodic data transmission resources preconfigured by the network device for the first terminal device, the periodic data transmission resources are used to transmit uplink data, the first request transmission resource belongs to periodic request transmission resources preconfigured by the network device for the first terminal device, and the periodic request transmission resources are used to transmit request information;

receiving, by the first terminal device, first authorization response information that is sent by the network device on a first authorization transmission resource, where the first authorization response information is used to indicate that the first terminal device can use the first data transmission resource, the first authorization transmission resource belongs to periodic authorization transmission resources preconfigured by the network device for the first terminal device, and the periodic authorization transmission resources are used to transmit authorization response information; and sending, by the first terminal device, uplink data on the first data transmission resource.

Therefore, according to the data transmission method provided in this application, when the first terminal device needs to send the uplink data, the first terminal device sends, to the network device, the first request information used to request the data transmission resource. After the network device receives the first request information, because a system preconfigures the periodic data transmission resources, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource. In this way, the first terminal device can directly send the uplink data on the first data transmission resource after receiving the first authorization response information. Compared with the prior art, in this application, the first terminal device can transmit the uplink data through only two times of information exchange. This helps reduce a latency in a data transmission process. This application has better applicability especially to a URLLC service with a relatively high requirement on the latency.

In addition, the system preconfigures the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

Optionally, after the sending, by the first terminal device, uplink data on the first data transmission resource, the method further includes:

receiving, by the first terminal device, acknowledgement information that is sent by the network device on a fourth authorization transmission resource in the periodic authorization transmission resources, where the acknowledgement information is used to indicate whether the network device correctly receives the uplink data; and determining, by the first terminal device based on the acknowledgement information, whether the uplink data is correctly received by the network device.

Therefore, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. The system does not need to reconfigure the resource used to transmit the acknowledgement information, thereby effectively improving resource utilization.

Optionally, the first request transmission resource is a request transmission resource in an $n^{th}$ period of periodic transmission resources preconfigured by the network device for the first terminal device, the first authorization transmission resource is an authorization transmission resource in an $(n+k)^{th}$ period of the periodic transmission resources, the first data transmission resource is a data transmission resource in an $(n+k+t)^{th}$ period of the periodic transmission resources, each period of the periodic transmission resources includes one request transmission resource, one authorization transmission resource, and one data transmission resource, n is an integer greater than 0, and k and t are both integers greater than or equal to 0.

Therefore, three types of transmission resources are configured in each period of the periodic transmission resources, so that when the first terminal device or the network device needs to send signaling (for example, the request information or the authorization response information) or data, it can be effectively ensured that the signaling or the data can be sent in time in each period of the transmission resources. This can further reduce the latency.

Optionally, duration of the period of the periodic transmission resources is one slot.

Therefore, on the basis that the data or the signaling can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce a latency in a communication process.

Optionally, k is 1, and t is 0; or k and t are both 1; or k and t are both 2.

Therefore, k is set to 1 and t is set to 0, or k and t are both set to 1, or k and t are both set to 2, so that the latency in the communication process can be further reduced, and further, a requirement of a low-latency service can be met.

Optionally, before the sending, by a first terminal device, first request information to a network device on a first request transmission resource, the method further includes:

sending, by the first terminal device, transmission latency information to the network device.

Optionally, before the sending, by a first terminal device, first request information to a network device on a first request transmission resource, the method further includes:

sending, by the first terminal device, resource-related information to the network device, where the resource-related information is used to indicate a maximum value of a size of the uplink data that the first terminal device needs to transmit, or the resource-related information is used to indicate a size of the periodic data transmission resources.

Optionally, the first request information and the first authorization response information are both one bit.

Therefore, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the first terminal device also only simply parses the first authorization response information to rapidly send the uplink data on the predefined first data transmission resource, thereby further reducing the transmission latency on the whole.

Optionally, the method further includes:

receiving, by the first terminal device, second indication information sent by the network device, where the second indication information is used to indicate a second target transmission resource, and the second target transmission resource includes the periodic request transmission resources, the periodic authorization transmission resources, and the periodic data transmission resources that are preconfigured by the network device for the first terminal device.

According to a third aspect, a data transmission method is provided. The method includes:

receiving, by a second terminal device, first indication information sent by a network device, where the first indication information is used to indicate a first target transmission resource, the first target transmission resource includes periodic data transmission resources and periodic authorization transmission resources that are preconfigured by the network device for a first terminal device, the periodic data transmission resources correspond to the periodic authorization transmission resources, the periodic data transmission resources are used to transmit uplink data sent by the first terminal device, the periodic authorization transmission resources are used to transmit authorization response information, and the authorization response information is used to indicate that the first terminal device can use a data transmission resource that the first terminal device requests to use; and when the second terminal device does not detect the authorization response information on a second authorization transmission resource in the periodic authorization transmission resources, sending, by the second terminal device, uplink data on a second data transmission resource corresponding to the second authorization transmission resource; or when the second terminal device detects the authorization response information on a second authorization transmission resource in the periodic authorization transmission resources, prohibiting, by the second terminal device, sending uplink data on a second data transmission resource corresponding to the second authorization transmission resource.

Therefore, the periodic authorization transmission resources and the periodic data transmission resources are informed to another terminal device (for example, the second terminal device) by using the first indication information, so that the second terminal device can detect whether the authorization transmission resource carries the authorization response information, to determine, based on correspondences between the periodic authorization transmission resources and the periodic data transmission resources, whether the second terminal device can use the corresponding data transmission resource. In addition, when detecting that an authorization transmission resource (for example, the second authorization transmission resource) does not carry the authorization response information, the second terminal device may determine that the first terminal device does not use the data transmission resource corresponding to the second authorization transmission resource. In this case, the second terminal device may send its uplink data on the data transmission resource corresponding to the second authorization transmission resource, so that the periodic data transmission resources are fully utilized, and resource utilization is effectively improved.

According to a fourth aspect, a data transmission apparatus is provided. The apparatus may be configured to perform operations of the network device according to any one of the first aspect and the possible implementations of the first aspect. Specifically, the apparatus may include modules or units configured to perform the operations of the network device according to any one of the first aspect or the possible implementations of the first aspect.

According to a fifth aspect, a data transmission apparatus is provided. The apparatus may be configured to perform operations of the first terminal device according to any one of the second aspect and the possible implementations of the second aspect. Specifically, the apparatus may include modules or units configured to perform the operations of the first terminal device according to any one of the second aspect or the possible implementations of the second aspect.

According to a sixth aspect, a data transmission apparatus is provided. The apparatus may be configured to perform operations of the second terminal device according to any one of the third aspect and the possible implementations of the third aspect. Specifically, the apparatus may include modules or units configured to perform the operations of the second terminal device according to any one of the third aspect or the possible implementations of the third aspect.

According to a seventh aspect, a network device is provided. The network device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the execution enables the network device to perform the method according to any one of the first aspect or the possible implementations of the first aspect, or the execution enables the network device to implement the apparatus according to the fourth aspect.

According to an eighth aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the execution enables the terminal device to perform the method according to any one of the second aspect or the possible implementations of the second aspect, or the execution enables the terminal device to implement the apparatus according to the fifth aspect.

According to a ninth aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the execution enables the terminal device to perform the method according to any one of the third aspect or the possible implementations of the third aspect, or the execution enables the terminal device to implement the apparatus according to the sixth aspect.

According to a tenth aspect, a chip system is provided. The chip system includes a memory and a processor. The memory is configured to store a computer program. The processor is configured to invoke the computer program from the memory and run the computer program, so that a communications device on which the chip system is installed performs the method according to any one of the first aspect/the second aspect/the third aspect and the possible implementations thereof.

According to an eleventh aspect, a computer program product is provided. The computer program product includes computer program code. When the computer program code is run by a communications unit and a processing unit or by a transceiver and a processor of a communications device (for example, a network device or a terminal device), the communications device is enabled to perform the method according to any one of the first aspect/the second aspect/the third aspect and the possible implementations thereof.

According to a twelfth aspect, a computer-readable storage medium is provided. The computer-readable storage medium stores a program. The program enables a communications device (for example, a network device or a terminal device) to perform the method according to any one of the first aspect/the second aspect/the third aspect and the possible implementations thereof.

According to a thirteenth aspect, a computer program is provided. When the computer program is executed on a computer, the computer is enabled to implement the method according to any one of the first aspect/the second aspect/the third aspect and the possible implementations thereof In some of the foregoing implementations, the method further includes: sending, by the network device, third indication information to the second terminal device, where the third indication information is used to indicate a third target transmission resource, and the third target transmission resource includes a fifth authorization transmission resource and a fifth data transmission resource corresponding to the fifth authorization transmission resource that are preconfigured by the network device for the first terminal device; and receiving, by the network device, uplink data that is sent by the second terminal device on the fifth data transmission resource, where the network device has not send the authorization response information on the fifth authorization transmission resource.

Therefore, the fifth authorization transmission resource and the corresponding fifth data transmission resource that are preconfigured by the network device for the first terminal device are informed to another terminal device (for example, the second terminal device) by using the third indication information, so that the second terminal device can detect whether the fifth authorization transmission resource carries the authorization response information, to determine, based on a correspondence between the fifth authorization transmission resource and the fifth data transmission resource, whether the second terminal device can use the corresponding fifth data transmission resource. In addition, when detecting that the fifth authorization transmission resource does not carry the authorization response information, the second terminal device may determine that the first terminal device does not use the fifth data transmission resource corresponding to the fifth authorization transmission resource. In this case, the second terminal device may send its uplink data on the fifth data transmission resource, so that the periodic data transmission resources are fully utilized, and the resource utilization is effectively improved.

In some of the foregoing implementations, there is an interval of at least one OFDM symbol between the first request transmission resource and the first authorization transmission resource in time domain, and there is an interval of at least one OFDM symbol between the first authorization transmission resource and the first data transmission resource in time domain.

In some of the foregoing implementations, the periodic request transmission resources may be resources specific to the first terminal device.

Therefore, the periodic request transmission resources are set to the resources specific to the first terminal device, so that when the terminal device sends the request information, a device identifier of the first terminal device does not need to be carried, and the network device can determine that the detected or received request information is the request information of the first terminal device, thereby reducing content of the request information. In this way, the periodic request transmission resources can occupy fewer resources, thereby saving resources on the whole. In addition, because the periodic request transmission resources are the resources specific to the first terminal device, the request information sent by the first terminal device does not interfere with other information, thereby ensuring that the network device can correctly receive the request information sent by the first terminal device.

In some of the foregoing implementations, the periodic authorization transmission resources may be resources specific to the first terminal device.

Therefore, the periodic authorization transmission resources are set to the resources specific to the first terminal device, so that the authorization response information sent by the network device does not need to carry the device identifier of the first terminal device, and the first terminal device can determine that the detected or received authorization response information is the authorization response information of the first terminal device, thereby reducing content of the authorization response information. In this way, the periodic authorization transmission resources can occupy fewer resources, thereby saving resources on the whole.

In some of the foregoing implementations, a time segment corresponding to the first request transmission resource belongs to a first time segment, a time segment corresponding to the first authorization transmission resource belongs to a second time segment, and the network device sends the first authorization response information to the first terminal device in the second time segment, where the first authorization response information is used to indicate that the first terminal device can use the first data transmission resource; and the method further includes:

receiving, by the network device, third request information sent by a third terminal device on a third request transmission resource, where the third request information is used to request to use the first data transmission resource, a time segment corresponding to the third request transmission resource belongs to the first time segment, the third request transmission resource belongs to periodic request transmission resources preconfigured by the network device for the third terminal device, the periodic request transmission resources configured by the network device for the third terminal device are different from the periodic request transmission resources configured by the network device for the first terminal device, and periodic data transmission resources configured by the network device for the third terminal device are the same as the periodic data transmission resources configured by the network device for the first terminal device; and sending, by the network device, third authorization response information to the third terminal device on a third authorization transmission resource, where the third authorization response information is used to indicate that the third terminal device can use a third data transmission resource in the periodic data transmission resources, the third authorization transmission resource belongs to periodic authorization transmission resources preconfigured by the network device for the third terminal device, the periodic authorization transmission resources of the third terminal device are different from the periodic authorization transmission resources of the first terminal device, and a time segment corresponding to the third authorization transmission resource belongs to a third time segment, where the third time segment is different from the second time segment, and the third data transmission resource is different from the first data transmission resource.

Therefore, when the network device configures the same periodic data transmission resources for the first terminal device and the third terminal device, if the first terminal device and the third terminal device send, in a same time segment, the request information used to request the same data transmission resource, the network device separately sends the authorization response information to the first terminal device and the third terminal device in different time segments, so that the first terminal device and the third terminal device send the uplink data on different data transmission resources, thereby effectively avoiding a conflict and improving transmission efficiency while saving system resources.

DETAILED DESCRIPTION OF EMBODIMENTS

Figure 1:
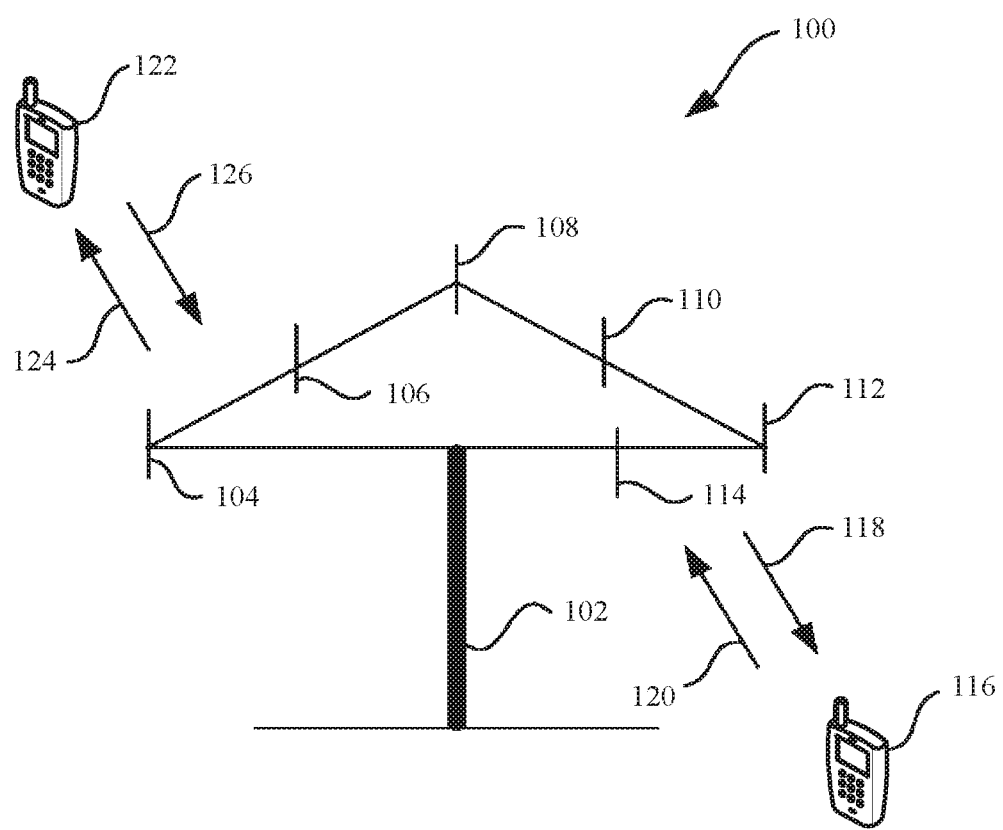
FIG. 1 is a schematic diagram of a communications system applied to data transmission in an embodiment of this application.

The following describes the technical solutions in this application with reference to the accompanying drawings.

The technical solutions of the embodiments of this application may be applied to various communications systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access. WiMAX) communications system, a future 5th generation (5th Generation, 5G) system, or a new radio (New Radio, NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

A network device in the embodiments of this application may be a device configured to communicate with a terminal device. The network device may be a base transceiver station (Base Transceiver Station BTS) in a global system for mobile communications (Global System of Mobile Communication, GSM) or a code division multiple access (Code Division Multiple Access, CDMA) system, or may be a NodeB (NodeB, NB) in a wideband code division multiple access (Wideband Code Division Multiple Access, WCDMA) system, or may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay node, an access point, a vehicle-mounted device, a wearable device, a network device in a future 5G network, or a network device in a future evolved PLMN network. This is not limited in the embodiments of this application.

FIG. 1 is a schematic diagram of a communications system applied to data transmission in an embodiment of this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. For example, the terminal devices 116 and 122 each may be a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (Frequency Division Duplex, FDD) system, the forward link 118 may use a frequency band different from that used by the reverse link 120, and the forward link 124 may use a frequency band different from that used by the reverse link 126.

For another example, in a time division duplex (Time Division Duplex, TDD) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector within coverage of the network device 102. In a process in which the network device 102 communicates with the terminal devices 116 and 122 by using the forward links 118 and 124 respectively, a transmit antenna of the network device 102 can improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly scattered in the related coverage, a mobile device in a neighboring cell is subject to less interference.

At a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a specific quantity of data bits that are to be sent to the wireless communications receiving apparatus through a channel. The data bits may be included in a transport block (or a plurality of transport blocks) of the data, and the transport block may be segmented to generate a plurality of code blocks.

In addition, the communications system 100 may be a public land mobile network (Public Land Mobile Network, PLMN), a D2D network, an M2M network, or another network. FIG. 1 is only an example of a simplified schematic diagram. The network may further include another network device not shown in FIG. 1.

The embodiments of this application may be applied to a communications system that includes a network device and at least one terminal device. Without loss of generality, the embodiments of this application are described below by using an example of interaction between the network device and a terminal device #A (for example, an example of a first terminal device) in the at least one terminal device.

The terminal device #A may be a terminal device that can support a URLLC service, or may be a terminal device that supports another low-latency service. This is not limited in the embodiments of this application.

First, before the embodiments of this application are described, three types of transmission resources in the embodiments of this application, namely, a request signaling transmission resource (request transmission resource for short below), an authorization signaling transmission resource (authorization transmission resource for short below), and an uplink data transmission resource (data transmission resource for short below), are respectively described briefly.

First Type of Resource: Periodic Request Transmission Resources

In the embodiments of this application, the network device preconfigures periodic request transmission resources for the terminal device #A. The request transmission resources are used to carry request information sent by the terminal device, and the request information is used to request a data transmission resource required to send uplink data.

The periodic request transmission resources may be on a physical uplink control channel (Physical Uplink Control Channel, PUCCH) or another defined control channel. Because the periodic request transmission resources are preconfigured, the network device may detect, at a fixed resource location, the request information sent by the terminal device, to determine whether the terminal device #A needs to request the data transmission resource or needs to send the uplink data.

Optionally, the periodic request transmission resources are resources specific to the terminal device #A. To be specific, the periodic request transmission resources can be used by only the terminal device #A, and another terminal device cannot use the periodic request transmission resources. In this way, when the request information sent by the terminal device #A does not carry a device identifier of the terminal device #A, the network device can determine that the detected or received request information is the request information of the terminal device #A, thereby reducing content of the request information. In this way, the periodic request transmission resources occupy fewer resources, thereby saving resources on the whole. In addition, because the periodic request transmission resources are the resources specific to the terminal device #A, the request information sent by the terminal device #A does not interfere with other information, thereby ensuring that the network device can correctly receive the request information sent by the terminal device #A.

By way of example rather than limitation, the periodic request transmission resources may alternatively be shared by a plurality of terminal devices. This is not limited in the embodiments of this application.

Second Type of Resource: Periodic Authorization Transmission Resources

The periodic authorization transmission resources are resources preconfigured by the network device for the terminal device #A. The authorization transmission resources are used to carry authorization response information, and the authorization response information is used to indicate that the terminal device #A can use a preconfigured data transmission resource.

The periodic request transmission resources may be on a physical downlink control channel (Physical Down Control Channel, PDCCH) or another defined control channel. Because the periodic authorization transmission resources are preconfigured, the terminal device #A may detect, at a fixed resource location, the authorization response information sent by the network device, to determine the data transmission resource used by the terminal device #A to send the uplink data.

Optionally, the periodic authorization transmission resources are resources specific to the terminal device #A. To be specific, the periodic authorization transmission resources can be used by only the terminal device #A, and another terminal device cannot use the periodic request transmission resources. In this way, when the authorization response information sent by the network device does not carry a device identifier of the terminal device #A, the terminal device can determine that the detected or received authorization response information is the authorization response information of the terminal device #A, thereby reducing content of the authorization response information. In this way, the periodic authorization transmission resources occupy fewer resources, thereby saving resources on the whole.

By way of example rather than limitation, the periodic authorization transmission resources may alternatively be shared by a plurality of terminal devices. This is not limited in the embodiments of this application.

Third Type of Resource: Periodic Data Transmission Resources

The periodic data transmission resources are resources preconfigured by the network device for the terminal device #A. The data transmission resources are used to carry uplink data sent by the terminal device #A.

It should be noted that the periodic data transmission resources may be resources of the terminal device #A, or may be resources that can be used by another terminal device.

For example, when the terminal device #A sends a low-latency service (for example, a URLLC service) by using the periodic data transmission resources, because the low-latency service may not be frequently generated, the terminal device #A may not usually use the periodic data transmission resources. To improve system resource utilization, the network device may allocate the periodic data transmission resources to another terminal device with a low priority of use permission, and the terminal device with the low priority of use permission can use some data transmission resources when the terminal device #A cannot use the data transmission resources.

Details about how a plurality of terminal devices share the periodic data transmission resources are not described herein. For detailed descriptions, refer to the following descriptions in which a plurality of terminal devices may share the periodic data transmission resources.

It should be further noted that, the foregoing three types of transmission resources include at least any one of the following resources: a time domain resource, a frequency domain resource, or a code domain resource.

In addition, each period of the periodic request transmission resources includes one request transmission resource, each period of the periodic authorization transmission resources includes one authorization transmission resource, and each period of the periodic data transmission resources includes one data transmission resource. In addition, duration of the period of the request transmission resource, duration of the period of the authorization transmission resource, and duration of the period of the data transmission resource may be the same or may be different, and may be specifically determined based on a size of content carried on each type of resource and a demodulation/decoding capability of the network device or the terminal device. This is not limited in the embodiments of this application.

Correspondences exist between the periodic request transmission resources and the periodic authorization transmission resources, correspondences exist between the periodic authorization transmission resources and the periodic data transmission resources, and correspondences exist between the periodic request transmission resources and the periodic data transmission resources. The three types of correspondences may be set based on specifications of a protocol or a system. The three types of correspondences are respectively described in detail below.

First Type of Correspondences: Correspondences Between the Periodic Request Transmission Resources and the Periodic Authorization Transmission Resources Specifically, for the periodic request transmission resources and the periodic authorization transmission resources, the protocol or the system may specify that an $m1^{th}$ authorization transmission resource after any request transmission resource (denoted as a request transmission resource #A for ease of distinguishing and understanding) is an authorization transmission resource corresponding to the request transmission resource #A. In a specific implementation, after the terminal device sends request information on the request transmission resource #A, the network device sends authorization response information on the $m1^{th}$ authorization transmission resource after the request transmission resource #A. Alternatively, the protocol or the system may specify that an authorization transmission resource in an $m2^{th}$ period of the periodic authorization transmission resources after a period of the request transmission resource #A is an authorization transmission resource corresponding to the request transmission resource #A. In a specific implementation, after the terminal device sends request information on the request transmission resource #A, the network device sends authorization response information on the authorization transmission resource in the $m2^{th}$ period of the periodic authorization transmission resources after the period of the request transmission resource #A. Similarly, the terminal device #A also knows that the terminal device #A needs to detect the authorization response information on the authorization transmission resource in the $m2^{th}$ period of the periodic authorization transmission resources after the period of the request transmission resource #A.

Second Type of Correspondences: Correspondences Between the Periodic Authorization Transmission Resources and the Periodic Data Transmission Resources Specifically, for the periodic authorization transmission resources and the periodic data transmission resources, the protocol or the system may specify that an $m3^{th}$ data transmission resource after any authorization transmission resource (denoted as an authorization transmission resource #A for ease of distinguishing and understanding) is a data transmission resource corresponding to the authorization transmission resource #A. In a specific implementation, after receiving authorization response information carried on the authorization transmission resource #A, the terminal device sends uplink data on the $m3^{th}$ data transmission resource after the authorization transmission resource #A. Alternatively, the protocol or the system may specify that a data transmission resource in an $m4^{th}$ period of the periodic data transmission resources after a period of the authorization transmission resource #A is a data transmission resource corresponding to the authorization transmission resource #A. In a specific implementation, after receiving authorization response information carried on the authorization transmission resource #A, the terminal device sends uplink data on the data transmission resource in the $m4^{th}$ period of the periodic data transmission resources after the period of the authorization transmission resource #A.

Third Type of Correspondences: Correspondences Between the Periodic Request Transmission Resources and the Periodic Data Transmission Resources In conclusion, because the three types of resources are preconfigured, and the correspondences between the periodic request transmission resources and the periodic authorization transmission resources and the correspondences between the periodic authorization transmission resources and the periodic data transmission resources are determined, the terminal device #A and the network device can clearly know a resource location used to receive or send information. Therefore, before sending request information, the terminal device #A clearly knows a resource location of a data transmission resource that the terminal device #A requests to use. In other words, there are correspondences between the periodic request transmission resources and the periodic data transmission resources.

For example, the protocol or the system may specify that the terminal device #A knows that the authorization transmission resource #A corresponding to the request transmission resource #A is the authorization transmission resource in the $m2^{th}$ period of the periodic authorization transmission resources after the period of the request transmission resource #A, and also knows that the data transmission resource #A corresponding to the authorization transmission resource #A is the data transmission resource in the $m4^{th}$ period of the periodic data transmission resources after the period of the authorization transmission resource #A. In this case, after generating the uplink data, and before sending the request information on the request transmission resource #A, the terminal device knows that the terminal device needs to request to use the data transmission resource #A. In other words, the data transmission resource corresponding to the request transmission resource #A is the data transmission resource #A.

As described above, the periodic data transmission resources may be resources of the terminal device #A, or may be resources that can be used by a terminal device with a low priority of use permission. Therefore, in the embodiments of this application, an objective of sending the request information by the terminal device #A is to enable the network device to know that the terminal device #A is to use the data transmission resource #A and to not allocate the data transmission resource #A to the terminal device with the low priority of use permission.

Figure 2:
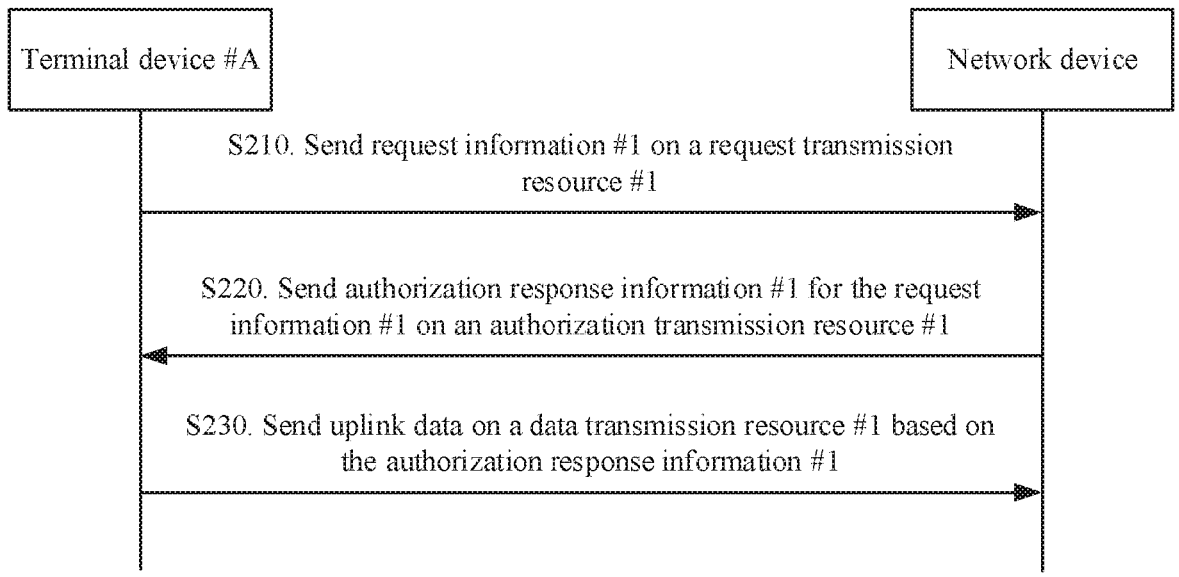
FIG. 2 is a schematic diagram of interaction between a network device and a terminal device #A in a data transmission method according to an embodiment of this application.

In addition, an objective of sending the authorization response information by the network device is to enable the terminal device #A to determine that the terminal device #A can use the data transmission resource #A. This is because the network device may not receive, due to complexity of a transmission process in the communications system, the request information sent by the terminal device #A. In this case, the network device does not know that the terminal device #A requests to use the data transmission resource #A, and may allocate the data transmission resource #A to the terminal device with the low priority of use permission. In addition, the terminal device #A knows that the terminal device #A requests to use the data transmission resource #A, and uses the data transmission resource #A when receiving no authorization response information. Therefore, the terminal device #A and the terminal device with the low priority of use permission simultaneously send the uplink data on the data transmission resource #A. Consequently, a conflict is caused, and transmission efficiency is lowered. Therefore, to avoid the foregoing problem, in the embodiments of this application, after receiving the request information, the network device sends the authorization response information to inform the terminal device #A that the terminal device #A can use the data transmission resource #A, and the terminal device #A can use the data transmission resource #A only when receiving the authorization response information. The following describes in detail a data transmission method according to embodiments of this application with reference to FIG. 2 to FIG. 7. FIG. 2 is a schematic interaction diagram of a data transmission method according to an embodiment of this application.

A data transmission process according to an embodiment of this application is first described in detail with reference to FIG. 2. FIG. 2 is a schematic diagram of interaction between a network device and a terminal device #A in the data transmission method according to this embodiment of this application.

In step S210, the terminal device #A sends request information #1 (namely, an example of first request information) to the network device on a request transmission resource #1 (namely, an example of a first request transmission resource), where the request information #1 is used to request a data transmission resource #1 (namely, an example of a first data transmission resource), the data transmission resource #1 belongs to periodic data transmission resources preconfigured by the network device for the terminal device #A and the request transmission resource #1 belongs to periodic request transmission resources preconfigured by the network device for the terminal device #A.

In other words, when the terminal device #A determines that the terminal device #A needs to send uplink data, before sending the uplink data, the terminal device #A sends the request information #1 on the request transmission resource #1, to request the data transmission resource #1 from the network device.

As described above, the periodic data transmission resources are preconfigured, and the terminal device #A may know, based on specifications of a protocol or a system, that the data transmission resource requested by the terminal device #A is the data transmission resource #1. Although the periodic data transmission resources are resources of the terminal device #A, the terminal device #A does not always use the resources, and the network device may allocate the data transmission resource to another terminal device with a low priority of use permission. Therefore, an objective of sending the request information #1 by the terminal device #A to the network device is to inform the network device that the terminal device #A needs to use the data transmission resource #1. Therefore, the terminal device #A determines, based on a feedback of the network device, that the data transmission resource #1 can be used, and prevents the another terminal device from using the data transmission resource #1.

In this embodiment of this application, because the periodic request transmission resources are preconfigured, both the network device and the terminal device #A clearly know resource locations of the periodic request transmission resources. After generating the uplink data, the terminal device #A may send the request information on a nearest request transmission resource (for example, the request transmission resource #1). In other words, the terminal device #A clearly knows a resource location of the request transmission resource #1 used to carry the request information #1. In other words, the terminal device #A clearly knows that the terminal device #A needs to send the request information #1 on the request transmission resource #1, and the terminal device #A sends the request information #1 to the network device on the request transmission resource #1. In step S210, the network device receives the request information #1, so that the network device knows that the terminal device needs to send the data, and needs to request to use the data transmission resource #1 used to carry the uplink data.

In step S220, after receiving the request information #1, the network device sends authorization response information (namely, an example of first authorization response information) on an authorization transmission resource #1 (for example, a first authorization transmission resource), where the authorization response information #1 is used to indicate that the terminal device #A can use the data transmission resource #1 (the authorization transmission resource #1 belongs to periodic authorization transmission resources preconfigured by the network device for the terminal device #A).

Specifically, because the periodic request transmission resources are preconfigured, the network device periodically detects, on the periodic request transmission resources, whether there is the request information sent by the terminal device #A. After detecting or receiving the request information #1, the network device knows that the terminal device #A needs to request a data transmission resource, and determines that the terminal device #A can send the uplink data on the data transmission resource #1 in the periodic data transmission resources, to inform, by using the authorization response information, the terminal device #A that the terminal device #A can send the uplink data on the data transmission resource #1.

Because the periodic authorization transmission resources are preconfigured, the network device may determine, based on the specifications of the protocol or the system, a resource location (for example, the authorization transmission resource #1) used to send the authorization transmission information #1.

In an optional implementation, the protocol or the system may specify that the first authorization transmission resource after the request transmission resource #1 is the authorization transmission resource #1, in other words, an authorization transmission resource corresponding to the request transmission resource #1 is the first authorization transmission resource after the request transmission resource #1. In a specific implementation, after receiving the request information #1, the network device sends the authorization response information on the first authorization transmission resource after the request transmission resource #1.

In this case, when a length of a period of the periodic request transmission resources is equal to a length of a period of the periodic authorization transmission resources, a period of the request transmission resource #1 and a period of the authorization transmission resource #1 are a same period. When a length of a period of the periodic request transmission resources differs from a length of a period of the periodic authorization transmission resources, a period of the request transmission resource #1 may partially overlap a period of the authorization transmission resource #1, or a period of the authorization transmission resource #1 is a period after a period of the request transmission resource #1.

In another optional implementation, considering that the network device needs a period of time to perform transformation or processing after receiving the request information #1, and then can send the authorization response information, the protocol or the system may specify that an authorization transmission resource in the first period or the second period of the periodic authorization transmission resources after a period of the request transmission resource #1 is the authorization transmission resource #1. In other words, the authorization transmission resource corresponding to the request transmission resource #1 is the authorization transmission resource in the first period or the second period of the periodic authorization transmission resources after the period of the request transmission resource #1. In a specific implementation, after receiving the request information #1, the network device sends the authorization response information #1 in the first period or the second period of the periodic authorization transmission resources after the period of the request transmission resource #1.

Assuming that the request transmission resource #1 is in an $n^{th}$ period (any one of a plurality of periods) of the periodic request transmission resources, the first period or the second period of the periodic authorization transmission resources after the $n^{th}$ period of the periodic request transmission resources is the period of the authorization transmission resource #1.

In this way, after the terminal device #A receives the authorization response information #1, in step S230, the terminal device #A sends the uplink data on the data transmission resource #1.

Specifically, the terminal device #A may determine, based on different indication manners or different content of the authorization response information, that the terminal device #A can use the data transmission resource #1. The following respectively describes two cases.

Case 1

In an optional implementation, regardless of whether the terminal device #A can use the data transmission resource #1, the network device sends the authorization response information, and indicates, by using "yes" or "no" indicated by the authorization response information, whether the terminal device can use the data transmission resource #1.

Specifically, the protocol or the system may specify that the first data transmission resource after the authorization transmission resource #1 is a data transmission resource (for example, the data transmission resource #1) that may be used by the terminal device #A. If a result indicated by the authorization response information is "yes" (for example, the authorization response information #1), it indicates that the terminal device #A can use the data transmission resource #1; or if a result indicated by the authorization response information is "no", it indicates that the terminal device #A cannot use the data transmission resource #1.

By way of example rather than limitation, the protocol or the system may alternatively specify that the first period or the second period of the periodic data transmission resources after the period of the authorization transmission resource #1 is a data transmission resource (for example, the data transmission resource #1) that may be used by the terminal device #A. This is not limited in this embodiment of this application.

Case 2

In another optional implementation, the protocol or the system may specify that the network device sends the authorization response information #1 on the authorization transmission resource #1 if determining that a data transmission resource that is after the authorization transmission resource #1 and that is specified based on the protocol or the system can be used by the terminal device #A; or the network device does not send any information on the authorization transmission resource #1 if determining that a data transmission resource that is after the authorization transmission resource #1 and that is specified based on the protocol or the system is used by another terminal device.

In addition, the protocol or the system may alternatively specify that the first data transmission resource after the authorization transmission resource #1 is a data transmission resource (for example, the data transmission resource #1) that may be used by the terminal device #A.

For the terminal device #A, after sending the request information #1, the terminal device #A may detect, based on the specifications of the protocol or the system, whether there is a signal on the authorization transmission resource #1 (in other words, detect whether the authorization response information is carried on the authorization transmission resource #1); and if the terminal device #A detects a signal on the authorization transmission resource #1, it indicates that the terminal device #A can use the data transmission resource #1 or if the terminal device #A does not detect any signal on the authorization transmission resource #1, it indicates that the terminal device #A cannot use the data transmission resource #1.

When the terminal device #A cannot use the data transmission resource #1, the following case may occur: For example, when system resources are insufficient, the network device may further pre-allocate the data transmission resource #1 to a terminal device #C. In this case, when the two terminal devices request to use the data transmission resource #1 at the same time, the network device cannot meet requirements of the two terminal devices at the same time, and the network device may indicate that the terminal device #C cannot use the data transmission resource #1.

By way of example rather than limitation, the protocol or the system may alternatively specify that the first period or the second period of the periodic data transmission resources after the period of the authorization transmission resource #1 is a data transmission resource (for example, the data transmission resource #1) that may be used by the terminal device #A. This is not limited in this embodiment of this application.

Therefore, according to the data transmission method provided in this application, when the first terminal device needs to send the uplink data, the first terminal device sends, to the network device, the first request information used to request the data transmission resource. After the network device receives the first request information, because the system preconfigures the periodic data transmission resources, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource, so that the first terminal device can directly send the uplink data on the first data transmission resource after receiving the first authorization response information. Compared with the prior art, in this embodiment of this application, the terminal device #A can transmit the uplink data through only two times of information exchange. This helps reduce a latency in a data transmission process. This application has better applicability especially to a URLLC service with a relatively high requirement on the latency.

In addition, the system preconfigures the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

Optionally, the first request transmission resource is a request transmission resource in an $n^{th}$ period of periodic transmission resources preconfigured by the network device for the first terminal device, the first authorization response transmission resource is an authorization response transmission resource in an $(n+k)^{th}$ period of the transmission resources, the first data transmission resource is a data transmission resource in an $(n+k+t)^{th}$ period of the transmission resources, each period of the transmission resources includes one request transmission resource, one authorization transmission resource, and one data transmission resource, n is an integer greater than 0, and k and t are both integers.

Specifically, the periodic request transmission resources, the periodic authorization transmission resources, and the periodic data transmission resources are the periodic transmission resources preconfigured by the network device for the first terminal device, and each period of the periodic transmission resources includes one request transmission resource, one authorization transmission resource, and one data transmission resource. To be specific, duration of the period of the periodic request transmission resources, duration of the period of the periodic authorization transmission resources, and duration of the period of the periodic data transmission resources are the same.

A relationship among the three types of resources in the periodic transmission resources is described in detail below with reference to FIG. 3 and FIG. 4.

Figure 3:
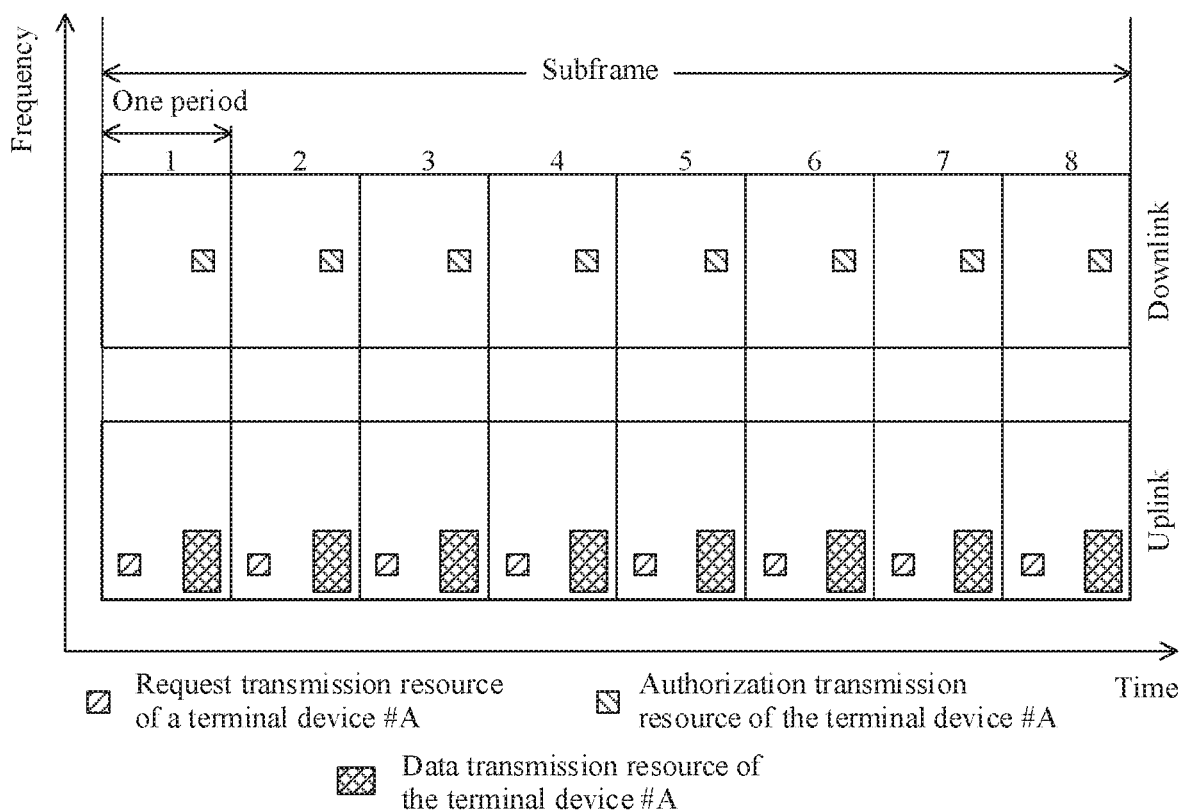
FIG. 3 is a schematic diagram of periodic transmission resources in a frequency division system according to an embodiment of this application.

FIG. 3 is a schematic diagram of a relationship among the three types of resources in the periodic transmission resources in a frequency division system according to an embodiment of this application.

FIG. 3 shows a case of the periodic transmission resources in one subframe. To be specific, one subframe includes eight periods, and duration of each period is one slot. Each period of the periodic transmission resources includes one request transmission resource, one authorization transmission resource, and one data transmission resource. The periodic request transmission resources and the periodic data transmission resources are uplink transmission resources, and the periodic authorization transmission resources are downlink transmission resources. In the frequency division system, an uplink transmission resource and a downlink transmission resource in each period of the periodic transmission resources use different frequency bands.

Figure 4:
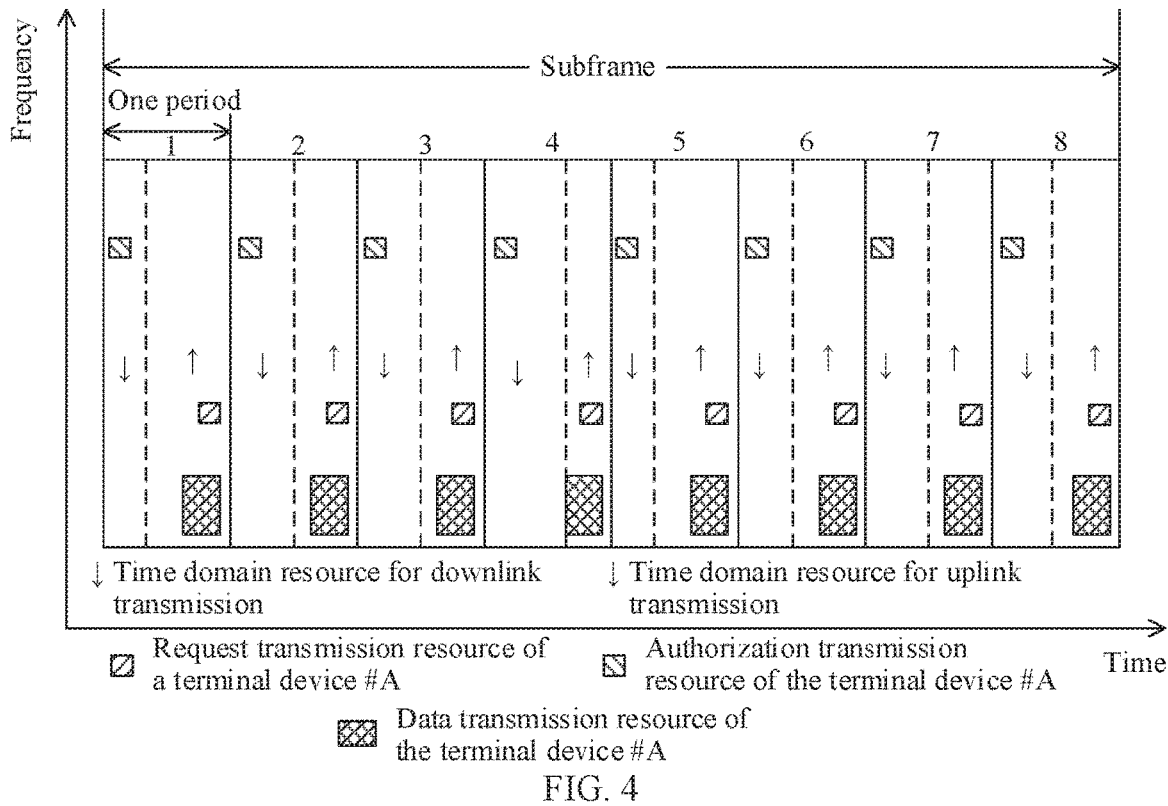
FIG. 4 is another schematic diagram of periodic transmission resources in a time division system according to an embodiment of this application.

FIG. 4 is a schematic diagram of a relationship among the three types of resources in the periodic transmission resources in a time division system according to an embodiment of this application.

FIG. 4 shows a case of the periodic transmission resources in one subframe. To be specific, one subframe includes eight periods, and duration of each period is one slot. Each period of the periodic transmission resources includes one request transmission resource, one authorization transmission resource, and one data transmission resource. The periodic request transmission resources and the periodic data transmission resources are uplink transmission resources, and the periodic authorization transmission resources are downlink transmission resources. In the time division system, an uplink transmission resource and a downlink transmission resource in each period of the periodic transmission resources use a same frequency band, but different time domain resources. For example, each period of the periodic transmission resources starts with downlink transmission and ends with uplink transmission.

When generating the uplink data, the terminal device #A sends the request information on a nearest request transmission resource (for example, the request transmission resource #1) in the transmission resources. The period of the request transmission resource #1 is a request transmission resource in an $n^{at}$ period of the periodic transmission resources. After receiving the request information #1, the network device #A may send, based on the specifications of the protocol and the system, the authorization response information #1 on an authorization transmission resource (for example, the authorization transmission resource #1) in an $(n+k)^{th}$ period of the periodic transmission resources, and the terminal device #A may send, based on the specifications of the protocol and the system, the uplink data on a data transmission resource (for example, the data transmission resource #1) in an $(n+k+t)^{th}$ period of the expected periodic transmission resources.

Therefore, three types of transmission resources are configured in each period of the periodic transmission resources, so that when the first terminal device or the network device needs to send signaling (for example, the request information or the authorization response information) or data, it can be effectively ensured that the signaling or the data can be sent in time in each period of the transmission resources. This can further reduce the latency.

Optionally, the period of the periodic transmission resources is one slot.

In other words, duration of one period shown in FIG. 3 or FIG. 4 is one slot. In other words, duration of one time unit shown in FIG. 3 or FIG. 4 is one slot. One slot includes a plurality of orthogonal frequency division multiplexing (Orthogonal Frequency Division Multiplexing, OFDM) symbols. For example, one slot includes 14 OFDM symbols.

For different subcarriers, duration of one OFDM symbol may be different. Based on a physical characteristic, a wider subcarrier may indicate a shorter OFDM symbol. For example, when a width of the subcarrier is 30 KHz, a length of the OFDM symbol is approximately 35.7 μs, and when a width of the subcarrier is 60 KHz, a length of the OFDM symbol reduces by half.

Therefore, on the basis that the data or the information can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce a latency in a communication process.

By way of example rather than limitation, the duration of the period of the periodic transmission resources may be duration of any time unit in which the data or the signaling can be transmitted. This is not limited in this embodiment of this application.

For example, the duration of the period of the periodic transmission resources may alternatively be two slots or another quantity of slots, or the duration of the period of the periodic transmission resources may be a plurality of OFDM symbols.

As described above, a time sequence relationship among the $n^{th}$ period of the periodic transmission resources, the $(n+k)^{th}$ period of the periodic transmission resources, and the $(n+k+t)^{th}$ period of the periodic transmission resources may be specified in the protocol or the system. To be specific, the protocol or the system may specify that the network device sends the authorization response information in a $k^{th}$ period of the periodic transmission resources after a period of the request transmission resource carrying the request information, and the terminal device #A sends the uplink data in a $t^{th}$ period of the periodic transmission resources after a period of the authorization transmission resource carrying the authorization response information.

To meet a requirement of the system on a low-latency service, it is expected that when a communication requirement can be met, the network device can respond to the request information of the terminal device #A at a relatively high speed after receiving the request information, and similarly, the terminal device #A can send the uplink data at a relatively high speed after receiving the authorization response information. Therefore, the protocol and the system may specify: Optionally, k is 1, and t is 0; or k and t are both 1; or k and t are both 2.

To be specific, when k is 1, and t is 0, the $n^{th}$ period of the periodic transmission resources and the $(n+k)^{th}$ period of the periodic transmission resources are adjacent periods, and the $(n+k+t)^{th}$ period of the periodic transmission resources and the $(n+k)^{th}$ period of the periodic transmission resources are a same period.

Alternatively, when k and t are both 1, the $n^{th}$ period of the periodic transmission resources and the $(n+k)^{th}$ period of the periodic transmission resources are adjacent periods, and the $(n+k+t)^{th}$ period of the periodic transmission resources and the $(n+k)^{th}$ period of the periodic transmission resources are adjacent periods.

Alternatively, when k and t are both 2, the $n^{th}$ period of the periodic transmission resources and the $(n+k)^{th}$ period of the periodic transmission resources are spaced by one period, and the $(n+k+t)^{th}$ period of the periodic transmission resources and the $(n+k)^{th}$ period of the periodic transmission resources are spaced by one period.

Generally, if a time used by the terminal device #A or the network device to process information is relatively short, both k and t may be set to 1, or a time used by the terminal device #A or the network device to process information is relatively long, both k and t may be set to 2.

By way of example rather than limitation, k and t may be other values, and may be specifically determined based on an actual situation. This is not limited in this embodiment of this application. For example, k and t may be determined based on a size of content of the request information and a size of content of the authorization response information. If the content of the request information is relatively large, the network device needs a relatively long time to process the information, and k may be set to a relatively large value. If the content of the authorization response information is relatively large, the terminal device #A needs a relatively long time to process the information, and t may be set to a relatively large value.

Therefore, k is set to 1 and t is set to 0, or k and t are both set to 1, or k and t are both set to 2, so that the latency in the communication process can be further reduced, and further, a requirement of the low-latency service can be met.

As described above, although the protocol or the system may specify the time sequence relationship among the $n^{th}$ period of the periodic transmission resources, the $(n+k)^{th}$ period of the periodic transmission resources, and the (n+k+ t)$^{th}$ period of the periodic transmission resources, due to complexity of the communication process, a case in which the terminal device #A or the network device cannot receive signaling or data at a resource location of an expected transmission resource inevitably occurs. Therefore, in this case, in this embodiment of this application, transmission reliability in the communication process can be improved as much as possible in the following manners.

For ease of description, FIG. 3 is still used as an example. The duration of the period of the periodic transmission resources is one slot, and k and t are both 1. In addition, to better describe this embodiment of this application by using FIG. 3, in the following descriptions, numbers of slots in FIG. 3 are used to represent numbers of periods of the transmission resources.

During normal transmission, after the terminal device #A sends the request information on a request transmission resource in a slot #1, the network device may send the authorization response information on an authorization transmission resource in a slot #2 based on the specifications of the protocol or the system, and the terminal device #A performs detection on the authorization transmission resource in the slot #2. Similarly, if detecting the authorization response information on the authorization transmission resource in the slot #2, the terminal device #A may send the uplink data on a data transmission resource in a slot #3 based on the specifications of the protocol or the system.

Manner 1: Delaying Sending the Authorization Response Information is Allowed.

To be specific, the network device may be allowed to appropriately delay sending the authorization response information, and specifically, it may be specified that the network device sends the authorization response information after a maximum of L periods.

Specifically, after sending the request information, if the terminal device #A does not detect any signal or does not receive the authorization response information on an authorization transmission resource in a period specified based on the protocol or the system, the terminal device #A may continue to perform detection on an authorization transmission resource in a next period of the L periods specified in the protocol or the system, until the authorization response information is detected or a quantity of successive detections exceeds a preset quantity of detections. If the network device still does not detect the authorization response information when the quantity of detections of the network device exceeds the preset quantity of detections, the terminal device #A may re-send the request information to request the data transmission resource again.

It should be noted that in this case, the data transmission resource that the terminal device #A requests to use may not be a determined resource, but is a data transmission resource corresponding to any authorization transmission resource that is in authorization transmission resources in the L periods and on which the authorization response information may be detected. Finally, after the authorization response information is detected on an authorization transmission resource in a period of the authorization transmission resources in the L periods, a data transmission resource that the terminal device #A can use may be determined.

Optionally, it may be specifically specified that the network device sends the authorization response information after a maximum of three slots. The terminal device #A sends the request information in the slot #1, and a data transmission resource requested in the request information is any one of data transmission resources in slots respectively corresponding to the slot #2, the slot #3, and a slot #4. If the terminal device #A does not detect the authorization response information in the slot #2, the slot #3, and the slot #4, the terminal device #A needs to re-send the request information in a slot #5. In addition, after sending the authorization response information, the network device may reserve, for the terminal device #A, a nearest data transmission resource after an authorization transmission resource carrying the authorization response information.

For example, if the network device cannot send the authorization response information on an authorization transmission information in the slot #2 in time, the network device sends the authorization response information on an authorization transmission resource in the slot #3. In this way, when detecting no authorization response information in the slot #2, the terminal device #A may continue to perform detection on the authorization transmission resource in the slot #3; and if detecting the authorization response information in the slot #3, the terminal device #A sends the uplink data on a data transmission resource in the slot #4.

Manner 2:

In Manner 1, if the terminal device #A re-sends the request information after determining that transmission of the request information fails, the latency is increased. Therefore, to improve transmission reliability, the terminal device #A may successively send the request information on request transmission resources in a plurality of periods. In this case, after detecting the request information on a request transmission resource in any period, the network device may send the authorization response information on authorization transmission resources in a plurality of consecutive periods after a moment at which the request information is detected. After detecting the first piece of authorization response information, the terminal device #A may also successively send the uplink data on data transmission resources in a plurality of periods, to ensure reliability of one transmission. This mechanism is referred to as K-repetition (K-repetition, K-repetition) transmission, and K refers to a quantity of repetitions. A value of K may be statically specified or semi-statically configured by the network device. If K is 1, it indicates that transmission is not repeated, in other words, only one transmission is performed; if K is 2, it indicates that two transmissions are performed; and so on. Certainly, it may alternatively be specified that if K is 0, it indicates that transmission is not repeated, in other words, only one transmission is performed; if K is 1, it indicates that two transmissions are performed; and so on. An example in which if K is 1, it indicates that transmission is not repeated is used below for description.

For example, assuming that K is 3, the terminal device #A may successively send the request information in the slot #1, the slot #2, and the slot #3.

If detecting the request information in the slot #1, the network device successively sends the authorization response information in the slot #2, the slot #3, and the slot #4, or if the network device cannot detect the request information in the slot #1 but detects the request information in the slot #2, the network device successively sends the authorization response information in the slot #3, the slot #4, and the slot #5. For the terminal device #A, after sending the request information from the slot #1, the terminal device #A starts to detect the authorization response information from the slot #2, and knows that the final authorization response information may occur in a slot #6. Assuming that the terminal device #A detects the authorization response information for the first time in the slot #4, the terminal device

A transmits data on data transmission resources in the slot #5, the slot #6, and a slot #7.

In this mechanism, the network device may no longer perform detection on request transmission resources in a plurality of subsequent periods after detecting the request information of the terminal device #A at any time. In other words, in one data transmission, the network device needs to detect only one piece of request information. After starting sending the authorization response information, the network device reserves data transmission resources in P periods after an authorization transmission resource carrying the first piece of authorization response information, and the data transmission resources in the P periods are all data transmission resources in the first period after a period of the authorization transmission resource carrying the first piece of authorization response information to the first period after a period of an authorization transmission resource carrying the last piece of authorization response information.

In the foregoing example, assuming that the network device successively sends the authorization response information in the slot #3, the slot #4, and the slot #5, the network device reserves data transmission resources in the slot #4, the slot #5, the slot #6, the slot #7, and a slot #8. A reason is as follows: If the terminal device #A receives the authorization response information in the slot #3, the terminal device #A successively sends the uplink data in the slot #4, the slot #5, and the slot #6; and if the terminal device #A does not detect the authorization response information in the slot #3 and the slot #4, and detects the authorization response information in the slot #5, the terminal device #A successively sends the uplink data in the slot #6, the slot #7, and the slot #8.

In addition, the terminal device #A needs to detect only one piece of authorization response information, and no longer performs detection on a remaining authorization transmission resource, and the terminal device #A no longer uses an extra data transmission resource reserved by the network device.

C is defined as a period (for example, a slot) of the transmission resources, Cx is a period whose sequence number is x, and x is an integer. In this case, the K-repetition transmission mechanism may be expressed by the following formula:

the terminal device #A transmits the request information on Cn to Cn+K−1;

the network device transmits the authorization response information on Cn+i+1 to Cn+i+K after detecting the request information for the first time on Cn+i, where i is greater than or equal to 0, and i is less than or equal to K−1; and the terminal device #A detects the authorization response information on Cn+1 to Cn+K+K−1, and transmits the uplink data on Cn+j+1 to Cn+j+K after detecting the authorization response information on Cn+j, where j is greater than or equal to 1, and j is less than or equal to K+K−1.

It should be understood that the K-repetition transmission actually occupies more system resources, but greatly improves transmission reliability.

As shown above, considering that the terminal device #A and the network device need a period of time to perform transformation or processing from receiving information to sending the information, and the network device or the terminal device #A may receive and process the information by using one slot as a whole, the network device is not necessarily capable of sending the authorization response information in a slot (for example, k=1) after a slot in which the request information is detected. Therefore, it may be specified that the slot in which the network device sends the authorization response information and the slot in which the request information is detected are spaced by one slot. Similarly, after detecting the authorization response information, the terminal device #A also sends the uplink data after one slot. To be specific, assuming that the terminal device #A sends the request information in the slot #1, the network device sends the authorization response information in the slot #3, and then the terminal device #A sends the uplink data in the slot #5.

Certainly, if the network device does not have sufficient time to send the authorization response information in the slot #3, the network device may send the authorization response information in the slot #4. Therefore, the terminal device #A may start successively performing detection on authorization transmission resources in several slots from the slot #3 until detecting the authorization response information.

According to the foregoing manner of the interval slot, assuming that a quantity of interval slots (periods) is v, where v is greater than or equal to 1, formulation descriptions for the K-repetition transmission are changed as follows:

the terminal device #A transmits the request information on Cn to Cn+K−1;

the network device transmits the authorization response information on Cn+i+1 to Cn+i+K after detecting the request information for the first time on Cn+i, where i is greater than or equal to 0 and is less than or equal to K−1+v; and the terminal device #A detects the authorization response information on Cn+v+1 to Cn+v+K+K−1, and transmits the data on Cn+j+1+v to Cn+j+K+v after detecting the authorization response information on Cn+j, where j is greater than or equal to v+1 and is less than or equal to v+K+K−1.

With reference to FIG. 3 and FIG. 4, the foregoing describes in detail the embodiments of this application from a perspective of the time sequence relationship among the three types of resources, and related actions of the terminal device #A and the network device in different time sequence relationships among the three types of resources. The following describes in detail the preconfigured resources in the embodiments of this application from a perspective of resource utilization.

In the embodiments of this application, system resource utilization may be improved in three manners.

Manner A:

Optionally, the method further includes:

sending, by the network device, first indication information to a second terminal device, where the first indication information is used to indicate a first target transmission resource, and the first target transmission resource includes the periodic data transmission resources and the periodic authorization transmission resources that are preconfigured by the network device for the first terminal device; and receiving, by the network device, uplink data that is sent by the second terminal device on a second data transmission resource, where the second data transmission resource belongs to the periodic data transmission resources, the second data transmission resource corresponds to a second authorization transmission resource in the periodic authorization transmission resources, and the network device has not sent the authorization response information on the second authorization transmission resource.

In other words, the periodic data transmission resources are not only resources of the terminal device #A, but also may be resources that can be used by a terminal device #B (namely, an example of the second terminal device). In other words, the periodic data transmission resources may be resources shared by the terminal device #A and the terminal device #B.

The terminal device #B may be a terminal device that supports a service insensitive to a latency requirement, or may be a terminal device that supports transmission of uplink data in a contention manner. Although the terminal device #B and the terminal device #A may share the periodic data transmission resources, the terminal device #A has a use priority.

Figure 5:
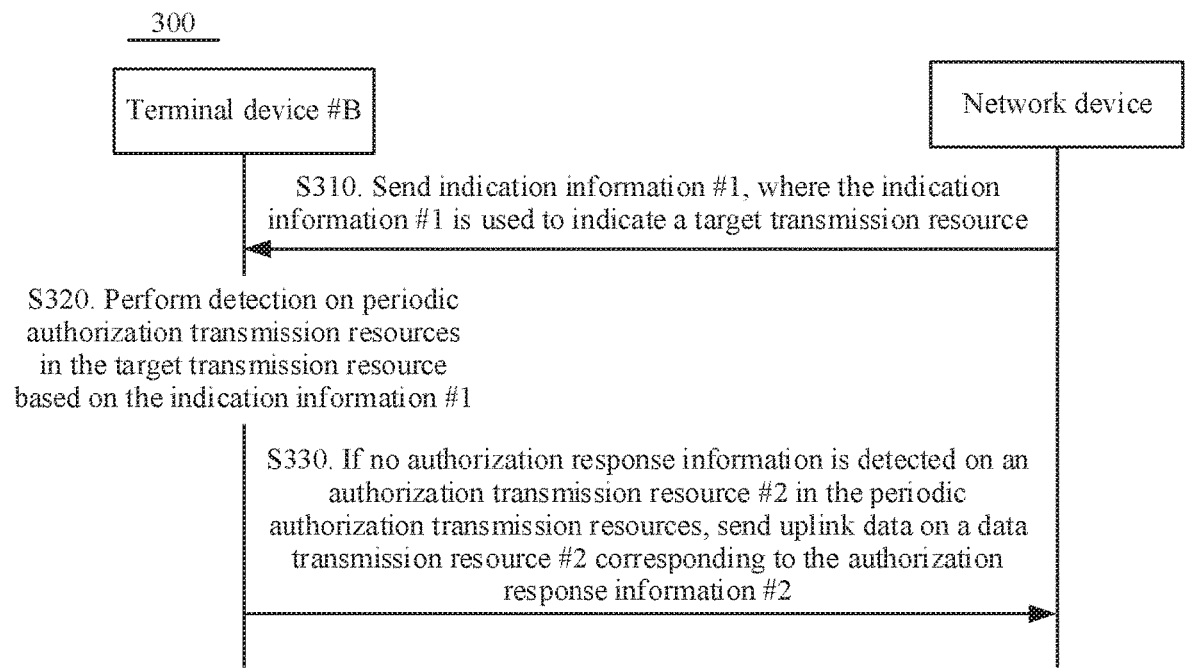
FIG. 5 is a schematic diagram of interaction between a network device and a terminal device #B in a data transmission method according to an embodiment of this application.
Figure 6:
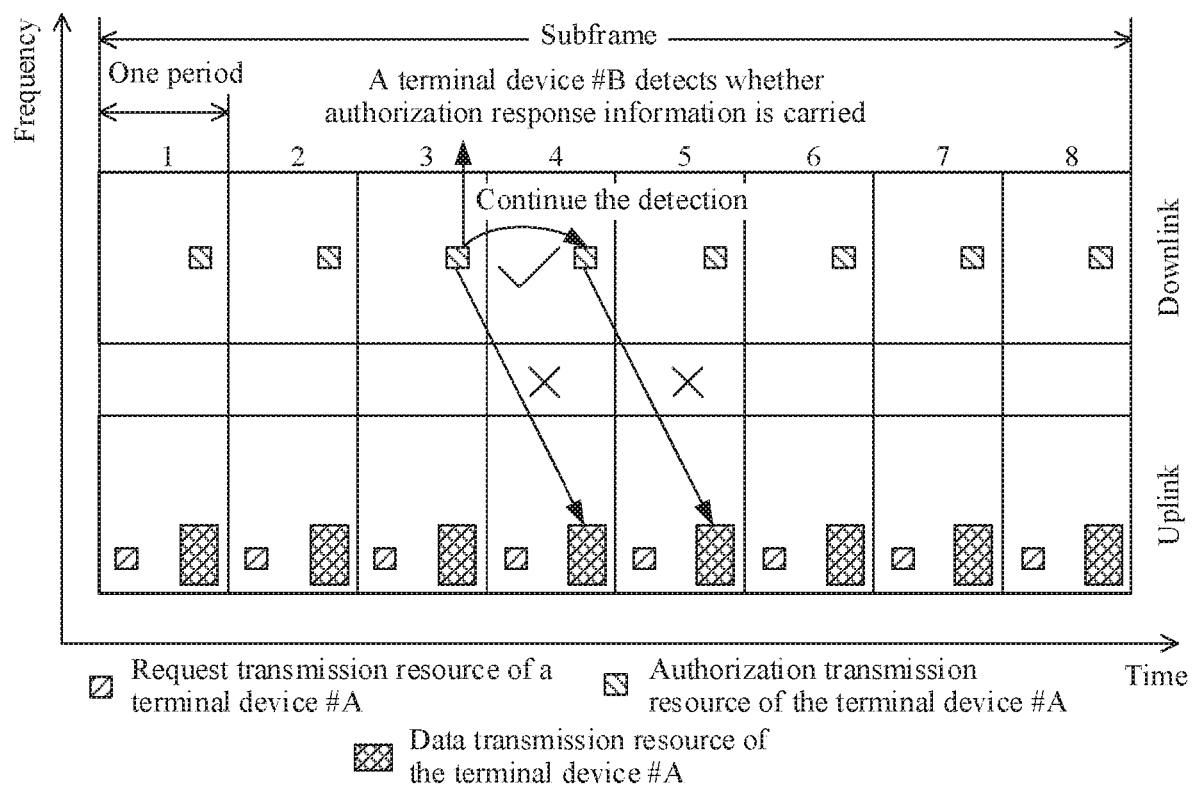
FIG. 6 is a schematic diagram of actions of a second terminal device in a data transmission method in periodic transmission resources in a frequency division system according to an embodiment of this application.

The following describes in detail, with reference to FIG. 5 and FIG. 6, a specific process in which the terminal device #B uses the periodic data transmission resources.

FIG. 5 is a schematic diagram of interaction between the network device and the terminal device #B in a data transmission method 300 according to an embodiment of this application.

In step S310, the network device informs the terminal device #B of the periodic data transmission resources and the periodic authorization transmission resources by using indication information #1 (namely, an example of the first indication information), indicating that the terminal device #B can use the periodic data transmission resources. However, when the terminal device #B has uplink data to be transmitted, the terminal device #B cannot use the periodic data transmission resources at any time.

Therefore, in step S320, before sending the uplink data, if the terminal device #B intends to use the periodic data transmission resources, the terminal device #B needs to perform detection on the periodic authorization transmission resources. Generally, the specifications of the protocol or the system may specify that the terminal device #B may perform detection only on an authorization transmission resource (denoted as an authorization transmission resource #2 for ease of distinguishing and understanding) in a nearest period after the terminal device #B generates the uplink data. If the terminal device #B detects authorization response information on the authorization transmission resource #2, it indicates that the terminal device #A may send the uplink data on a corresponding data transmission resource (denoted as a data transmission resource #2 for ease of distinguishing and understanding) based on the specifications of the protocol or the system. In this case, the terminal device #B cannot send the uplink data on the data transmission resource #2, and has to delay sending or perform a common request authorization process to obtain a resource used to transmit the data. If the terminal device #B does not detect the authorization response information on the authorization transmission resource #2, it indicates that the terminal device temporarily does not send the uplink data on the data transmission resource #2. In this case, the terminal device #B may send the uplink data by using the data transmission resource #2.

By way of example rather than limitation, the protocol or the system may specify that the terminal device #B may perform detection on authorization transmission resources in Q relatively near periods after the terminal device #B generates the uplink data, where Q may be a value specified by the protocol or the system. The terminal device #B successively performs detection on the authorization transmission resources in the Q periods, to determine whether the terminal device #B can use data transmission resources, where the authorization transmission resource #2 is any one of the authorization transmission resources in the Q periods. The terminal device #B can send the uplink data on a corresponding data transmission resource as long as the terminal device #B detects an authorization transmission resource that does not carry the authorization response information. If the terminal device #B detects, on the authorization transmission resources in the Q periods, that all the authorization transmission resources carry the authorization response information, the terminal device #B delays sending or performs a common request authorization process (to be specific, a network device-based scheduling method in the prior art) to obtain a resource used to transmit the data.

FIG. 6 is a schematic action diagram of the terminal device #B in a data transmission method in periodic transmission resources in a frequency division system according to an embodiment of this application. In FIG. 6, the terminal device #B generates the uplink data before a time segment corresponding to an authorization transmission resource in the slot #3, and the terminal device #B intends to use the data transmission resources of the terminal device #A. In this case, the terminal device #B detects whether the authorization transmission resource in the slot #3 carries the authorization response information. If the terminal device #B does not detect the authorization response information, the terminal device #B may send the uplink data on a data transmission resource in the slot #4. If the terminal device #B detects the authorization transmission resource, it indicates that the terminal device #A may use the data transmission resource in the slot #4. Then, the terminal device #B may continue to detect, based on the specifications of the protocol or the system (for example, the protocol or the system may specify that the terminal device #B may perform detection on authorization transmission resources in two relatively near periods after the terminal device #B generates the uplink data), whether an authorization transmission resource in the slot #4 carries the authorization response information. If the terminal device #B does not detect the authorization response information, the terminal device #B may send the uplink data on a data transmission resource in the slot #5. If the terminal device #B detects the authorization transmission resource, it indicates that the terminal device #A may use the data transmission resource in the slot #5. In this case, the terminal device #B may independently perform a network device-based scheduling method in the prior art, to obtain a resource used to transmit the data.

It should be noted that, when the periodic data transmission resources can be shared by terminal devices that transmit the uplink data in a contention manner, the network device may send the indication information #1 to all the terminal devices that can transmit the uplink data in the contention manner, and the periodic data transmission resources are configured in a resource pool that is in a system and that is used to transmit the uplink data in the contention manner.

Therefore, the periodic authorization transmission resources and the periodic data transmission resources are informed to another terminal device (for example, the second terminal device) by using the first indication information, so that the second terminal device can detect whether the authorization transmission resource carries the authorization response information, to determine, based on the correspondences between the periodic authorization transmission resources and the periodic data transmission resources, whether the second terminal device can use the corresponding data transmission resource. In addition, when detecting that an authorization transmission resource (for example, the second authorization transmission resource) does not carry the authorization response information, the second terminal device may determine that the first terminal device does not use the data transmission resource corresponding to the second authorization transmission resource. In this case, the second terminal device may send its uplink data on the data transmission resource corresponding to the second authorization transmission resource, so that the periodic data transmission resources are fully utilized, and resource utilization is effectively improved.

Optionally, the method further includes:

sending, by the network device, third indication information to the second terminal device, where the third indication information is used to indicate a third target transmission resource, and the third target transmission resource includes a fifth authorization transmission resource and a fifth data transmission resource corresponding to the fifth authorization transmission resource that are preconfigured by the network device for the first terminal device; and receiving, by the network device, uplink data that is sent by the second terminal device on the fifth data transmission resource, where the network device has not send the authorization response information on the fifth authorization transmission resource.

To be specific, the network device informs the terminal device #B of a specific authorization transmission resource (for example, the fifth authorization transmission resource) in the periodic authorization transmission resources and a corresponding data transmission resource by using the third indication information. In this way, when the terminal device #B needs to transmit the uplink data and intends to use a data transmission resource #5 (namely, an example of the fifth data transmission resource), the terminal device #B detects whether an authorization transmission resource #5 (namely, an example of the fifth authorization transmission resource) carries the authorization response information. If the terminal device #B does not detect the authorization response information carried on the authorization transmission resource #5, the terminal device #B can send the uplink data on the data transmission resource #5. If the terminal device #B detects the authorization response information carried on the authorization transmission resource #5, the terminal device #B prohibits sending the uplink data on the data transmission resource #5.

By way of example rather than limitation, the third indication information may be periodically or discontinuously sent to the terminal device #B, to inform the terminal device #B of a data transmission resource that may be used by the terminal device #B.

For example, the terminal device #A has a relatively large quantity of low-latency services in a time segment, and the terminal device #A frequently uses a data transmission resource in the current time segment to send the uplink data. In this case, the network device may not send the third indication information to the terminal device #B. The terminal device #A has a relatively small quantity of low-latency services in another time segment, and the terminal device #A does not frequently use a data transmission resource in the current time segment to send the uplink data. In this case, the network device may periodically send the third indication information to the terminal device #B in the current time segment. Certainly, when the terminal device #A has a relatively small quantity of low-latency services in the another time segment, the network device may alternatively inform, at a time by using the third indication information, the terminal device #B of data transmission resources corresponding to the current time segment.

Manner B

The network device may preconfigure a same data transmission resource for the terminal device #A and another terminal device (for example, the third terminal device). In other words, the periodic data transmission resources may be resources shared by the terminal device #A and the terminal device #C (namely, an example of the third terminal device). The terminal device #C may be a terminal device that supports the low-latency service.

It should be noted that when the network device configures the same data transmission resource for the terminal device #A and the terminal device #C, each period of the periodic request transmission resources in this embodiment of this application also includes a request transmission resource of the terminal device #C. Similarly, each period of the periodic authorization transmission resources also includes an authorization transmission resource of the terminal device #C.

Figure 7:
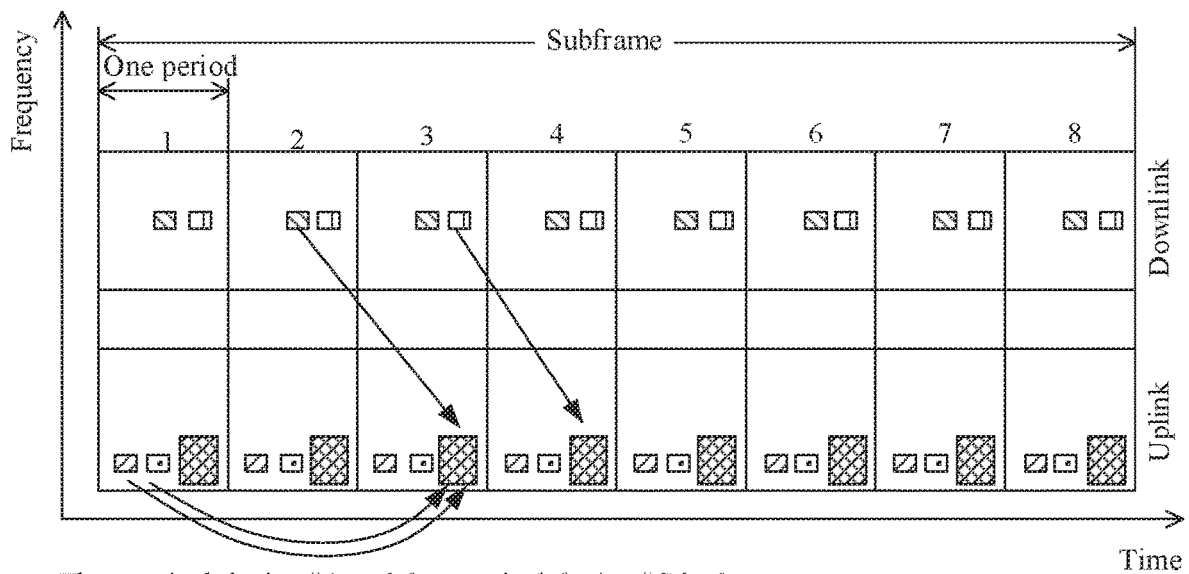
FIG. 7 is still another schematic diagram of periodic transmission resources in a frequency division system according to an embodiment of this application.

FIG. 7 is a schematic diagram of a relationship among the three types of resources that are included in the periodic transmission resources and that are of the first terminal device and the third terminal device in a frequency division system according to an embodiment of this application. As shown in FIG. 7, each period of the periodic transmission resources includes not only three types of resources of the terminal device #A, but also three types of resources of the terminal device #C. In each period, a request transmission resource of the terminal device #A is different from a request transmission resource of the terminal device #C, an authorization transmission resource of the terminal device #A is different from an authorization transmission resource of the terminal device #C, and a data transmission resource of the terminal device #A is the same as a data transmission resource of the terminal device #C.

It can be learned from the foregoing descriptions that, when the data transmission resource of the terminal device #A is the same as that of the terminal device #C, the terminal device #A and the terminal device #C inevitably request to use the same data transmission resource. In this way, different terminal devices transmit the uplink data on the same data transmission resource, and a conflict is caused. Consequently, transmission efficiency is affected. Therefore, to effectively avoid this case, the method further includes:

Optionally, a time segment corresponding to the first request transmission resource belongs to a first time segment, and a time segment corresponding to the first authorization transmission resource belongs to a second time segment:

the receiving, by a network device, first request information that is sent by a first terminal device on a first request transmission resource includes:

receiving, by the network device, the first request information that is sent by the first terminal device in the first time segment:

the sending, by the network device, first authorization response information to the first terminal device on a first authorization transmission resource, where the first authorization response information is used to indicate that the first terminal device can use the first data transmission resource includes:

sending, by the network device, the first authorization response information to the first terminal device in the second time segment, where the first authorization response information is used to indicate that the first terminal device can use the first data transmission resource; and the method further includes:

receiving, by the network device, third request information sent by the third terminal device in the first time segment, where the first request information and the third request information are both used to request the first data transmission resource, and periodic data transmission resources preconfigured by the network device for the third terminal device are the same as the periodic data transmission resources preconfigured by the network device for the first terminal device;

sending, by the network device, third authorization response information to the third terminal device in a third time segment to which a time segment corresponding to a third authorization transmission resource belongs, where the third authorization response information is used to indicate that the third terminal device can use a third data transmission resource corresponding to the third authorization transmission resource, the third authorization transmission resource belongs to periodic authorization transmission resources preconfigured by the network device for the third terminal device, and the third data transmission resource belongs to the periodic data transmission resources preconfigured by the network device for the third terminal device; and receiving, by the network device, uplink data that is sent by the third terminal device on the third data transmission resource.

Specifically, when the terminal device #A and the terminal device #C send the request information (for example, the terminal device #A sends the request information #1, and the terminal device #C sends request information #3 (namely, an example of the third request information)) in a same time segment (for example, the first time segment), both the terminal device #A and the terminal device #C request to use the data transmission resource #1. It may be specified based on the system or the protocol that if the network device also sends the authorization response information to the terminal device #A and the terminal device #C in a same time segment, the terminal device #A and the terminal device #C also send the uplink data in a same time segment. In other words, the terminal device #A and the terminal device #C both send the uplink data on the data transmission resource #1.

Therefore, in this case, the network device needs to coordinate the data transmission resource. To be specific, the network device does not send the authorization response information to both the terminal device #A and the terminal device #C in a same time segment, but time segments in which the authorization response information is sent are staggered. To be specific, the network device sends the authorization response information #1 to the terminal device #A in the second time segment, and sends authorization response information #3 (namely, an example of the third authorization response information) to the terminal device #C in the third time segment. In this way, it may be specified based on the protocol and the system that the terminal device #A sends the uplink data on a data transmission resource (for example, the data transmission resource #1) in a time segment at an interval of fixed duration from the second time segment, and the terminal device #C also sends the uplink data on a data transmission resource (for example, the third data transmission resource) in a time segment at an interval of fixed duration from the third time segment.

It should be noted that the foregoing time segments may belong to time segments corresponding to different periods of the corresponding periodic transmission resources, and the time segments may alternatively be time segments corresponding to different periods of the periodic transmission resources.

FIG. 7 is still used as an example below. An example in which the time segments are the time segments corresponding to the different periods of the periodic transmission resources and the duration of the period of the periodic transmission resources is one slot is used. Related steps of the network device, the terminal device #A, and the terminal device #C in this case are described in detail.

It is assumed that the terminal device #A sends the request information #1 by using a request transmission resource (for example, the request transmission resource #1) of the terminal device #A in the slot #1 (in other words, the first time segment), and the terminal device #C also sends the request information #3 by using a request transmission resource (denoted as a request transmission resource #3 for ease of distinguishing and understanding) of the terminal device #C in the slot #1. In this case, to avoid a conflict, the network device may send the authorization response information #1 on an authorization transmission resource (for example, the authorization transmission resource #1) of the terminal device #A in the slot #2 (namely, the second time segment), and the network device may send the authorization response information #3 on an authorization transmission resource (denoted as an authorization transmission resource #3 for ease of distinguishing and understanding) of the terminal device #C in the slot #3 (namely, the third time segment). In this case, based on the specifications of the protocol or the system (it is assumed that the protocol or the system may specify that the terminal device can use a data transmission resource in the first period of the periodic data transmission resources after a period of the authorization transmission resource carrying the authorization response information), the terminal device #A may send the uplink data on a data transmission resource (namely, the data transmission resource #1) in the first slot (namely, the slot #3) after the slot #2, and the terminal device #C may send the uplink data on a data transmission resource (namely, the third data transmission resource) in the first slot (namely, the slot #4) after the slot #3. In this way, the conflict can be effectively avoided.

It can be learned from the foregoing that in Manner B, after sending the request information, the terminal device #A or the terminal device #C needs to continuously listen to respective authorization response information on respective authorization transmission resources.

Therefore, when the network device configures the same data transmission resource for the first terminal device and the third terminal device, if the first terminal device and the third terminal device send the request information in the same time segment, the network device sends the authorization response information to the first terminal device and the third terminal device in different time segments, so that the first terminal device and the third terminal device send the uplink data on different data transmission resources, thereby effectively avoiding the conflict and improving the transmission efficiency while saving system resources.

Manner C:

Optionally, after the receiving, by the network device on the first data transmission resource, uplink data sent by the first terminal device, the method further includes:

sending, by the network device, acknowledgement information on a fourth authorization transmission resource in the authorization transmission resources, where the acknowledgement information is used to indicate whether the network device correctly receives the uplink data sent by the first terminal device.

Specifically, when the terminal device #A does not need to perform K-repetition transmission, the network device sends the authorization response information only once for the request information #1 sent by the terminal device #A. Therefore, after the terminal device #A sends the uplink data on the data transmission resource #1, the network device may reuse the periodic authorization transmission resources. To be specific, the periodic authorization transmission resources may be further used to carry the acknowledgement information for the uplink data. For the terminal device #A, after the request information #1 is sent, information received on a subsequent authorization transmission resource is the authorization response information, and the second piece of received information is the acknowledgement information.

There may be the following implementations of how the acknowledgement information indicates a receiving status of the network device for the uplink data. It should be understood that the following implementations are only examples for description, and all solutions of transmitting the acknowledgement information by using the periodic authorization transmission resources fall within the protection scope of the embodiments of this application.

In an optional implementation, the network device sends the acknowledgement information regardless of whether the receiving status of the network device for the uplink data is correct receiving or incorrect receiving. If the network device correctly receives the downlink data, the acknowledgement information indicates that the network device correctly receives the downlink data otherwise, the acknowledgement information indicates that the network device incorrectly receives the downlink data. After sending the uplink data, the terminal device #A demodulates and decodes information (namely, the acknowledgement information) received on a predefined authorization transmission resource #4 (namely, an example of the fourth authorization transmission resource) after the authorization transmission resource #1, to determine whether the uplink data is correctly received.

In another optional implementation, the network device sends the acknowledgement information only when the network device correctly receives the uplink data; or the network device does not send any information when the network device incorrectly receives the uplink data. For the terminal device #A, after sending the uplink data, if the terminal device #A receives the acknowledgement information on the authorization transmission resource #4, the terminal device #A considers that the uplink data is correctly received by the network device; or if the terminal device #A does not receive any information on the authorization transmission resource #4, the terminal device #A considers that the uplink data is incorrectly received by the network device.

In another optional implementation, the network device sends the acknowledgement information only when the network device incorrectly receives the uplink data; or the network device does not send any information when the network device correctly receives the uplink data. For the terminal device #A, after sending the uplink data, if the terminal device #A receives the acknowledgement information on the authorization transmission resource #4, the terminal device #A considers that the uplink data is incorrectly received by the network device; or if the terminal device #A does not receive any information on the authorization transmission resource #4, the terminal device #A considers that the uplink data is correctly received by the network device. When the network device incorrectly receives the uplink data, the network device reserves a subsequent data transmission resource for the terminal device #A. When determining that the uplink data is incorrectly received by the network device, the terminal device #A may learn of, based on the specifications of the protocol or the system, a resource location that is of a data transmission resource, that is reserved by the network device for the terminal device #A, and that is used to send the retransmitted data, and retransmits the uplink data on the corresponding data transmission resource.

Optionally, the authorization transmission resource #4 is the first authorization transmission resource located after the data transmission resource #1 in time domain.

Optionally, the authorization transmission resource #4 is, in time domain, in the first period of the periodic authorization transmission resources after a period of the data transmission resource #1.

Therefore, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. The system does not need to reconfigure the resource used to transmit the acknowledgement information, thereby effectively improving resource utilization.

Optionally, before the receiving, by a network device, first request information that is sent by a first terminal device on a first request transmission resource, the method further includes:

receiving, by the network device, transmission latency information sent by the first terminal device; and determining, by the network device based on the transmission latency information, duration of a period of the request transmission resources, duration of a period of the authorization transmission resources, and duration of a period of the data transmission resources.

Specifically, the transmission latency information is used to indicate a maximum latency that the terminal device #A can accept. Before configuring the three types of periodic resources, the network device may determine, based on the transmission latency information sent by the terminal device #A, the duration of the periods of the three types of preconfigured periodic resources.

A formula $$c = \frac{d}{l \times 4}$$

may be used to represent the duration of the period, c represents the duration of the period, d represents the maximum latency that the terminal device can accept, and l represents a time unit (for example, a slot or a subframe).

It is assumed that the periods of the three types of resources have same duration, each period includes three types of resources, and l represents one slot. When one subframe includes eight slots, l is 0.125 millisecond. When d is 0.5 millisecond or 0.6 millisecond, c is one slot. To be specific, the network device allocates three types of resources to the terminal device #A in each slot. When d is 1 millisecond or 1.3 milliseconds, c is two slots. To be specific, the network device allocates three types of resources to the terminal device #A in every two slots, that is, the duration of one period is two slots.

By way of example rather than limitation, the terminal device #A may not need to send the transmission latency information to the network device, and the system may use a fixed period. For example, the system considers by default that one slot is the duration of the period of each type of resource. Alternatively, the network device may use a default value of d, for example, 0.5 milliseconds or 1 millisecond, to determine the duration of the period of each type of resources based on the foregoing formula.

Optionally, before the receiving, by a network device, first request information that is sent by a first terminal device on a first request transmission resource, the method further includes:

receiving, by the network device, resource-related information sent by the first terminal device, where the resource-related information is used to indicate a maximum value of a size of the uplink data that the first terminal device needs to transmit, or the resource-related information is used to indicate a size of the data transmission resource; and determining, by the network device, the size of the data transmission resource based on the resource-related information.

To be specific, before configuring the periodic data transmission resources, the network device may determine, based on the resource-related information sent by the terminal device #A, the size of the data transmission resource.

Specifically, the resource-related information may be a maximum value of uplink data that the terminal device #A may generate, and the maximum value of the uplink data that the terminal device #A may generate may be determined based on a service type supported by the terminal device #A. Further, the size of the data transmission resource is determined based on the size of the uplink data and a transmission rate. Alternatively, the resource-related information may be directly the size of the data transmission resource.

By way of example rather than limitation, the terminal device #A may not need to send the resource-related information to the network device, and the network device may use a default value as the size of the data transmission resource. For example, a resource size corresponding to 1 k bytes and a minimum transmission rate is the size of the data transmission resource, or a resource size that is used for a low-latency service and that is predefined in the system is the size of the data transmission resource.

In this way, after determining the duration of the periods of the three types of transmission resources and the size of the data transmission resource, the network device may configure the three types of transmission resources for the terminal device #A. To enable the terminal device #A to learn of the transmission resources for the terminal device #A, in this embodiment of this application, optionally, the method further includes:

sending, by the network device, second indication information to the first terminal device, where the second indication information is used to indicate a second target transmission resource, and the second target transmission resource includes the periodic request transmission resources, the periodic authorization transmission resources, and the periodic data transmission resources that are preconfigured by the network device for the first terminal device.

In other words, the network device may inform, by using the second indication information, the terminal device #A of the three types of transmission resources that can be used in a data transmission process.

By way of example rather than limitation, the periodic request transmission resources and the periodic authorization transmission resource may be obtained through calculation based on the periodic data transmission resources and a parameter related to the terminal device #A (for example, a device identifier of the terminal device #A). This is not limited in this embodiment of this application.

Optionally, the first request information and the first authorization response information are both one bit.

In this case, the periodic request transmission resources and the periodic authorization transmission resources may all be resources specific to the terminal device #A. Because identification information of the terminal device #A may not need to be included to distinguish information sent by different terminal devices, the request information #1 and the authorization response information #1 may both include one bit.

In this way, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the terminal device #A also only simply parses the first authorization response information to rapidly send the uplink data on the predefined first data transmission resource, thereby further reducing the transmission latency on the whole.

By way of example rather than limitation, the network device may preconfigure an uplink transmission resource and a downlink transmission resource for the terminal device #A. The uplink transmission resource may be used to transmit a plurality of types of information including the request information, and the downlink transmission resource may be used to transmit a plurality of types of information including the authorization response information. In this case, information sent by the terminal device #A or the network device may include a plurality of bits, and the plurality of bits are used to indicate at least a type of the sent information.

For example, when the terminal device #A sends the request information #1, the request information #1 includes a plurality of bits, some of the plurality of bits are used to indicate that the terminal device #A requests to use the data transmission resource #1, and some other bits of the plurality of bits are used to indicate that a type of the information sent by the terminal device is the request information.

Similarly, when the network device sends the authorization response information #1, the authorization response information #1 includes a plurality of bits, some of the plurality of bits are used to indicate that the terminal device #A can use the data transmission resource #1, and some other of the plurality of bits are used to indicate that a type of the information sent by the network device is the authorization response information.

Therefore, according to the data transmission method provided in the embodiments of this application, when the first terminal device needs to send the uplink data, the first terminal device sends, to the network device, the first request information used to request the data transmission resource. After the network device receives the first request information, because the system preconfigures the periodic data transmission resources, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource. In this way, the terminal device #A can directly send the uplink data on the first data transmission resource after receiving the first authorization response information. Compared with the prior art, in this application, the first terminal device can transmit the uplink data through only two times of information exchange. This helps reduce the latency in the data transmission process. This application has better applicability especially to the URLLC service with the relatively high requirement on the latency.

In addition, the system preconfigures the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

In addition, the periodic authorization transmission resources and the periodic data transmission resources are informed to another terminal device (for example, the second terminal device) by using the first indication information, so that the second terminal device can detect whether the authorization transmission resource carries the authorization response information, to determine, based on the correspondences between the periodic authorization transmission resources and the periodic data transmission resources, whether the second terminal device can use the corresponding data transmission resource. In addition, when detecting that an authorization transmission resource (for example, the second authorization transmission resource) does not carry the authorization response information, the second terminal device may determine that the first terminal device does not use the data transmission resource corresponding to the second authorization transmission resource. In this case, the second terminal device may send its uplink data on the data transmission resource corresponding to the second authorization transmission resource, so that the periodic data transmission resources are fully utilized, and the resource utilization is effectively improved.

In addition, when the network device configures the same data transmission resource for the first terminal device and the third terminal device, if the first terminal device and the third terminal device send the request information in the same time segment, the network device separately sends the authorization response information to the first terminal device and the third terminal device in different time segments, so that the first terminal device and the third terminal device send the uplink data on different data transmission resources, thereby effectively avoiding the conflict and improving the transmission efficiency while saving the system resources.

In addition, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. The system does not need to reconfigure the resource used to transmit the acknowledgement information, thereby effectively improving the resource utilization.

In addition, the three types of transmission resources are configured in each period of the periodic transmission resources, so that when the first terminal device or the network device needs to send the signaling (for example, the request information or the authorization response information) or the data, it can be effectively ensured that the signaling or the data can be sent in time in each period of the transmission resources. This can further reduce the latency.

In addition, on the basis that the data or the signaling can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce the latency in the communication process.

In addition, k is set to 1 and t is set to 0, or k and t are both set to 1, or k and t are both set to 2, so that the latency in the communication process can be further reduced, and further, the requirement of the low-latency service can be met.

In addition, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the terminal device #A also only simply parses the first authorization response information to rapidly send the uplink data on the predefined first data transmission resource, thereby further reducing the transmission latency on the whole.

The data transmission method according to the embodiments of this application is described in detail above with reference to FIG. 1 to FIG. 7, and a data transmission apparatus according to embodiments of this application is described below with reference to FIG. 8 to FIG. 13. Technical features described in the method embodiments are also applicable to the following apparatus embodiments.

Figure 8:
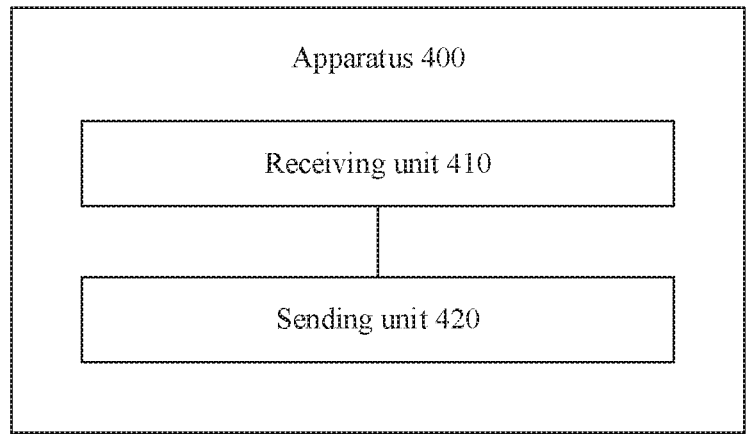
FIG. 8 is a schematic block diagram of a data transmission apparatus 400 according to an embodiment of this application.

FIG. 8 is a schematic block diagram of a data transmission apparatus 400 according to an embodiment of this application. As shown in FIG. 8, the apparatus 400 includes:

a receiving unit 410, configured to receive first request information that is sent by a first terminal device on a first request transmission resource, where the first request information is used to request to use a first data transmission resource, the first data transmission resource belongs to periodic data transmission resources preconfigured by the apparatus for the first terminal device, the periodic data transmission resources are used to transmit uplink data, the first request transmission resource belongs to periodic request transmission resources preconfigured by the apparatus for the first terminal device, and the periodic request transmission resources are used to transmit request information; and a sending unit 420, configured to send first authorization response information to the first terminal device on a first authorization transmission resource, where the first authorization response information is used to indicate that the first terminal device can use the first data transmission resource, the first authorization transmission resource belongs to periodic authorization transmission resources preconfigured by the apparatus for the first terminal device, and the periodic authorization transmission resources are used to transmit authorization response information, where the receiving unit 410 is further configured to receive uplink data that is sent by the first terminal device on the first data transmission resource.

Therefore, according to the data transmission apparatus provided in this application, when the first terminal device needs to send the uplink data, the first terminal device sends, to the network device, the first request information used to request the data transmission resource. After the network device receives the first request information, because a system preconfigures the periodic data transmission resources, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource. In this way, the first terminal device can directly send the uplink data on the first data transmission resource after receiving the first authorization response information. Compared with the prior art, in this embodiment of this application, the first terminal device can transmit the uplink data through only two times of information exchange. This helps reduce a latency in a data transmission process. This application has better applicability especially to a URLLC service with a relatively high requirement on the latency.

In addition, the system preconfigures the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

Optionally, the sending unit 420 is further configured to send first indication information to a second terminal device, where the first indication information is used to indicate a first target transmission resource, and the first target transmission resource includes the periodic data transmission resources and the periodic authorization transmission resources that are preconfigured by the network device for the first terminal device; and the receiving unit 410 is further configured to receive uplink data that is sent by the second terminal device on a second data transmission resource, where the second data transmission resource belongs to the periodic data transmission resources, the second data transmission resource corresponds to a second authorization transmission resource in the periodic authorization transmission resources, and the sending unit has not sent the authorization response information on the second authorization transmission resource.

Therefore, the periodic authorization transmission resource and the periodic data transmission resources are informed to another terminal device (for example, the second terminal device) by using the first indication information, so that the second terminal device can detect whether the authorization transmission resource carries the authorization response information, to determine, based on correspondences between the periodic authorization transmission resources and the periodic data transmission resources, whether the second terminal device can use the corresponding data transmission resource. In addition, when detecting that an authorization transmission resource (for example, the second authorization transmission resource) does not carry the authorization response information, the second terminal device may determine that the first terminal device does not use the data transmission resource corresponding to the second authorization transmission resource. In this case, the second terminal device may send its uplink data on the data transmission resource corresponding to the second authorization transmission resource, so that the periodic data transmission resources are fully utilized, and resource utilization is effectively improved.

Optionally, a time segment corresponding to the first request transmission resource belongs to a first time segment, and a time segment corresponding to the first authorization transmission resource belongs to a second time segment;

the receiving unit is specifically configured to receive the first request information that is sent by the first terminal device in the first time segment;

the sending unit is specifically configured to send the first authorization response information to the first terminal device in the second time segment, where the first authorization response information is used to indicate that the first terminal device can use the first data transmission resource;

the receiving unit 410 is further configured to receive third request information that is sent by a third terminal device in the first time segment, where the first request information and the third request information are both used to request the first data transmission resource, and periodic data transmission resources preconfigured by the apparatus for the third terminal device are the same as the periodic data transmission resources preconfigured by the apparatus for the first terminal device;

the sending unit 420 is further configured to send third authorization response information to the third terminal device in a third time segment to which a time segment corresponding to a third authorization transmission resource belongs, where the third authorization response information is used to indicate that the third terminal device can use a third data transmission resource corresponding to the third authorization transmission resource, the third authorization transmission resource belongs to periodic authorization transmission resources preconfigured by the apparatus for the third terminal device, and the third data transmission resource belongs to the periodic data transmission resources preconfigured by the apparatus for the third terminal device; and the receiving unit 410 is further configured to receive uplink data that is sent by the third terminal device on the third data transmission resource.

Therefore, when the network device configures the same data transmission resource for the first terminal device and the third terminal device, if the first terminal device and the third terminal device send the request information in the same time segment, the network device separately sends the authorization response information to the first terminal device and the third terminal device in different time segments, so that the first terminal device and the third terminal device send the uplink data on different data transmission resources, thereby effectively avoiding a conflict and improving transmission efficiency while saving system resources.

Optionally, after the receiving unit 410 receives the uplink data that is sent by the first terminal device on the first data transmission resource, the sending unit 420 is further configured to:

send acknowledgement information on a fourth authorization transmission resource in the periodic authorization transmission resources, where the acknowledgement information is used to indicate whether the apparatus correctly receives the uplink data sent by the first terminal device.

Therefore, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. The system does not need to reconfigure the resource used to transmit the acknowledgement information, thereby effectively improving the resource utilization.

Optionally, the first request transmission resource is a request transmission resource in an $n^{th}$ period of periodic transmission resources preconfigured by the apparatus for the first terminal device, the first authorization transmission resource is an authorization response transmission resource in an $(n+k)^{th}$ period of the periodic transmission resources, the first data transmission resource is a data transmission resource in an $(n+k+t)^{th}$ period of the periodic transmission resources, each period of the periodic transmission resources includes one request transmission resource, one authorization transmission resource, and one data transmission resource, n is an integer greater than 0, and k and t are both integers greater than or equal to 0.

Therefore, three types of transmission resources are configured in each period of the periodic transmission resources, so that when the first terminal device or the network device needs to send signaling (for example, the request information or the authorization response information) or data, it can be effectively ensured that the signaling or the data can be sent in time in each period of the transmission resources. This can further reduce the latency.

Optionally, duration of the period of the periodic transmission resources is one slot.

Therefore, on the basis that the data or the signaling can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce the latency in the communication process.

Optionally, k is 1, and t is 0; or k and t are both 1; or k and t are both 2.

Therefore, k is set to 1 and t is set to 0, or k and t are both set to 1, or k and t are both set to 2, so that the latency in the communication process can be further reduced, and further, a requirement of a low-latency service can be met.

Optionally, before the receiving unit 410 receives the first request information sent by the first terminal device on the first request transmission resource, the receiving unit 410 is further configured to:

receive transmission latency information sent by the first terminal device; and the apparatus further includes:

a processing unit 430, configured to determine, based on the transmission latency information received by the receiving unit, duration of a period of the periodic request transmission resources, duration of a period of the periodic authorization transmission resources, and duration of a period of the periodic data transmission resources.

Optionally, before the receiving unit 410 receives the first request information sent by the first terminal device on the first request transmission resource, the receiving unit 410 is further configured to:

receive resource-related information sent by the first terminal device, where the resource-related information is used to indicate a maximum value of a size of the uplink data that the first terminal device needs to transmit, or the resource-related information is used to indicate a size of the periodic data transmission resources; and the apparatus further includes:

a processing unit 430, configured to determine the size of the periodic data transmission resources based on the resource-related information received by the receiving unit 410.

Optionally, the first request information and the first authorization response information both include one bit.

Therefore, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the terminal device #A also only simply parses the first authorization response information to rapidly send the uplink data on the predefined first data transmission resource, thereby further reducing the transmission latency on the whole.

Optionally, the sending unit 420 is further configured to:

send second indication information to the first terminal device, where the second indication information is used to indicate a second target transmission resource, and the second target transmission resource includes the periodic request transmission resources, the periodic authorization transmission resources, and the periodic data transmission resources that are preconfigured by the network device for the first terminal device.

The data transmission apparatus 400 may correspond to the network device described in the method 200 (for example, may be configured in the network device or may be the network device), and modules or units in the data transmission apparatus 400 are respectively used to perform actions or processing processes performed by the network device in the method 200. To avoid repetition, details are not described herein.

Figure 9:
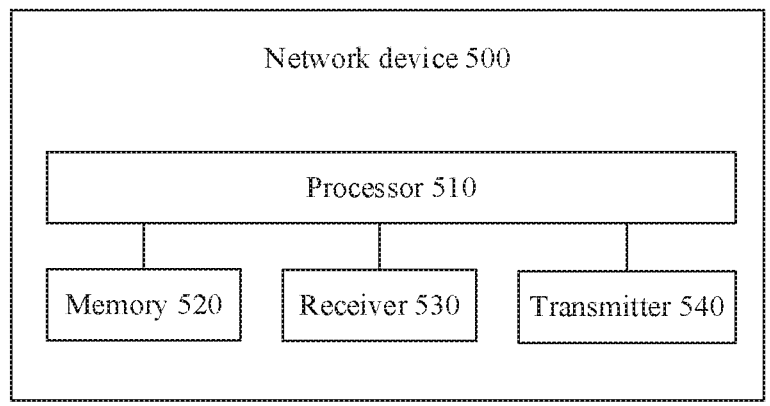
FIG. 9 is a schematic structural diagram of a data transmission network device 500 according to an embodiment of this application.

In this embodiment of this application, the apparatus 400 may be a network device. FIG. 9 is a schematic structural diagram of a data transmission network device 500 according to an embodiment of this application. As shown in FIG. 9, the network device 500 may include a processor 510, a transmitter 540, and a receiver 530. The processor 510, the transmitter 540, and the receiver 530 are communicatively connected. Optionally, the network device 500 further includes a memory 520, and the memory 520 is communicatively connected to the processor 510. Optionally, the processor 510, the memory 520, the transmitter 540, and the receiver 530 may be communicatively connected. The memory 520 may be configured to store an instruction. The processor 510 is configured to execute the instruction stored in the memory, to control the transmitter 540 to send information or control the receiver 530 to receive a signal.

In this case, the receiving unit 410 in the apparatus 400 shown in FIG. 8 may correspond to the receiver 530 in the network device 500 shown in FIG. 9, and the sending unit 420 in the apparatus 400 shown in FIG. 8 may also correspond to the transmitter 540 in the network device 500 shown in FIG. 9. In another implementation, the transmitter 540 and the receiver 530 may be implemented by a same component, namely, a transceiver.

In this embodiment of this application, the apparatus 400 may be a chip (or a chip system) installed in a terminal device. In this case, the apparatus 400 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit in the apparatus 400 shown in FIG. 8 may correspond to the input interface, and the sending unit in the apparatus 400 shown in FIG. 8 may correspond to the output interface.

Figure 10:
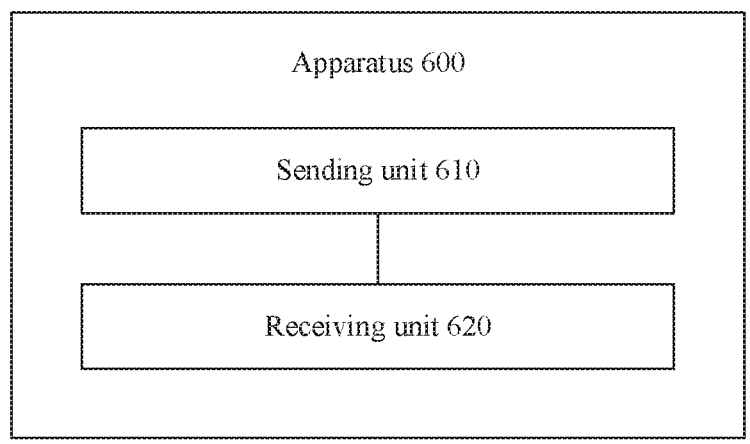
FIG. 10 is a schematic block diagram of a data transmission apparatus 600 according to an embodiment of this application.

FIG. 10 is a schematic block diagram of a data transmission apparatus 600 according to an embodiment of this application. As shown in FIG. 10, the apparatus 600 includes:

a sending unit 610, configured to send first request information to a network device on a first request transmission resource, where the first request information is used to request to use a first data transmission resource, the first data transmission resource belongs to periodic data transmission resources preconfigured by the network device for the first terminal device, the periodic data transmission resources are used to transmit uplink data, the first request transmission resource belongs to periodic request transmission resources preconfigured by the network device for the first terminal device, and the periodic request transmission resources are used to transmit request information; and a receiving unit 620, configured to receive first authorization response information that is sent by the network device on a first authorization transmission resource, there the first authorization response information is used to indicate that the first terminal device can use the first data transmission resource, the first authorization transmission resource belongs to periodic authorization transmission resources preconfigured by the network device for the first terminal device, and the periodic authorization transmission resources are used to transmit authorization response information, where the sending unit 610 is further configured to send uplink data on the first data transmission resource.

Therefore, according to the data transmission apparatus provided in this application, when the first terminal device needs to send the uplink data, the first terminal device sends, to the network device, the first request information used to request the data transmission resource. After the network device receives the first request information, because a system preconfigures the periodic data transmission resources, the network device can directly determine, in the periodic data transmission resources, the data transmission resource (for example, the first data transmission resource) that the first terminal device can use, and directly inform, by using the first authorization response information, the first terminal device that the first terminal device can use the first data transmission resource. In this way, the first terminal device can directly send the uplink data on the first data transmission resource after receiving the first authorization response information. Compared with the prior art, in this embodiment of this application, the first terminal device can transmit the uplink data through only two times of information exchange. This helps reduce a latency in a data transmission process. This application has better applicability especially to a URLLC service with a relatively high requirement on the latency.

In addition, the system preconfigures the periodic request transmission resources used to transmit the request information and the periodic authorization transmission resources used to transmit the authorization response information for the request information, so that the first terminal device can clearly know a resource location (for example, the first request transmission resource) used to transmit the first request information, and a resource location (for example, the first authorization transmission resource) used to receive the first authorization response information, and the network device clearly knows to receive the first request information on the first request transmission resource and to send the first authorization response information on the first authorization transmission resource. The network device does not need to send extra signaling to learn of the first request transmission resource and the first authorization transmission resource. This reduces information exchange between the first terminal device and the network device, and can also help reduce the latency.

Optionally, after the sending unit 610 sends the uplink data on the first data transmission resource, the receiving unit 620 is further configured to:

receive acknowledgement information that is sent by the network device on a fourth authorization transmission resource in the periodic authorization transmission resources, where the acknowledgement information is used to indicate whether the network device correctly receives the uplink data and the apparatus further includes:

a processing unit 630, configured to determine, based on the acknowledgement information, whether the uplink data is correctly received by the network device.

Therefore, after sending the uplink data, the first terminal device reuses a predefined authorization transmission resource (for example, the fourth authorization transmission resource) that is in the periodic authorization transmission resources and that is after the first data transmission resource, as a resource used to transmit the acknowledgement information. The system does not need to reconfigure the resource used to transmit the acknowledgement information, thereby effectively improving resource utilization.

Optionally, the first request transmission resource is a request transmission resource in an $n^{th}$ period of periodic transmission resources preconfigured by the network device for the first terminal device, the first authorization transmission resource is an authorization transmission resource in an $(n+k)^{th}$ period of the periodic transmission resources, the first data transmission resource is a data transmission resource in an $(n+k+t)^{th}$ period of the periodic transmission resources, each period of the periodic transmission resources includes one request transmission resource, one authorization transmission resource, and one data transmission resource, n is an integer greater than 0, and k and t are both integers greater than or equal to 0.

Therefore, three types of transmission resources are configured in each period of the periodic transmission resources, so that when the first terminal device or the network device needs to send signaling (for example, the request information or the authorization response information) or data, it can be effectively ensured that the signaling or the data can be sent in time in each period of the transmission resources. This can further reduce the latency.

Optionally, duration of the period of the periodic transmission resources is one slot.

Therefore, on the basis that the data or the signaling can be transmitted, the duration of the period of the transmission resources is set to one slot, so that the transmission resources can be configured relatively densely. Further, when needing to transmit the data or the signaling, the network device or the first terminal device can rapidly perform communication on the periodic transmission resources. This helps further reduce the latency in the communication process.

Optionally, k is 1, and t is 0; or k and t are both 1, or k and t are both 2.

Therefore, k is set to 1 and t is set to 0, or k and t are both set to 1, or k and t are both set to 2, so that the latency in the communication process can be further reduced, and further, a requirement of a low-latency service can be met.

Optionally, before the sending unit 610 sends the first request information to the network device on the first request transmission resource, the sending unit 610 is further configured to:

send transmission latency information to the network device.

Optionally, before the sending unit 610 sends the first request information to the network device on the first request transmission resource, the sending unit 610 is further configured to:

send resource-related information to the network device, where the resource-related information is used to indicate a maximum value of a size of the uplink data that the first terminal device needs to transmit, or the resource-related information is used to indicate a size of the periodic data transmission resources.

Optionally, the first request information and the first authorization response information both include one bit.

Therefore, the first request information and the first authorization response information both include one bit, or the first request information and the first authorization response information are both one-bit information, so that each of the periodic request transmission resources occupies a very small resource, and each of the periodic authorization transmission resources occupies a very small resource. In this way, the periodic request transmission resources and the periodic authorization transmission resources each occupy a relatively small resource, thereby reducing a waste of resources. In addition, the first request information and the first authorization response information both include one bit, so that the network device only needs to simply parse the first request information to rapidly send the authorization response information, and the terminal device #A also only simply parses the first authorization response information to rapidly send the uplink data on the predefined first data transmission resource, thereby further reducing the transmission latency on the whole.

Optionally, the receiving unit 620 is further configured to:

receive second indication information sent by the network device, where the second indication information is used to indicate a second target transmission resource, and the second target transmission resource includes the periodic request transmission resources, the periodic authorization transmission resources, and the periodic data transmission resources that are preconfigured by the network device for the apparatus.

The data transmission apparatus 600 may correspond to the first terminal device described in the method 200 (for example, may be configured in the first terminal device or may be the first terminal device), and modules or units in the data transmission apparatus 600 are respectively used to perform actions or processing processes performed by the first terminal device in the method 200. To avoid repetition, details are not described herein.

Figure 11:
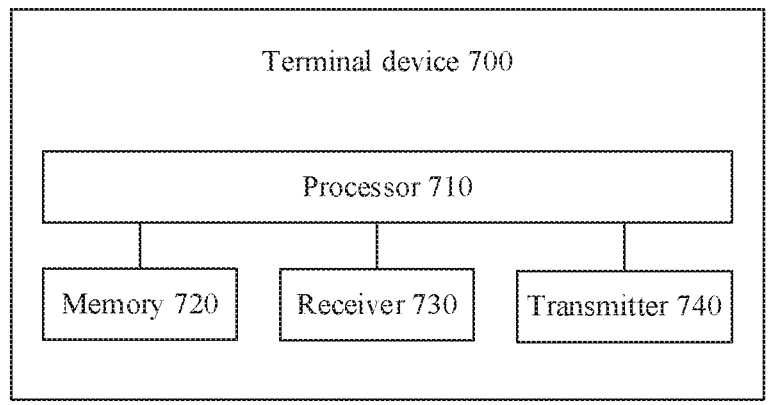
FIG. 11 is a schematic structural diagram of a data transmission terminal device 700 according to an embodiment of this application.

The apparatus 600 may be the first terminal device. FIG. 11 is a schematic structural diagram of a data transmission terminal device 700 according to an embodiment of this application. As shown in FIG. 11, the terminal device 700 may include a processor 710, a transmitter 740, and a receiver 730. The processor 710, the transmitter 740, and the receiver 730 are communicatively connected. Optionally, the terminal device 700 further includes a memory 720, and the memory 720 is communicatively connected to the processor 710. Optionally, the processor 710, the memory 720, the transmitter 740, and the receiver 730 may be communicatively connected. The memory 720 may be configured to store an instruction. The processor 710 is configured to execute the instruction stored in the memory, to control the transmitter 740 to send information or control the receiver 730 to receive a signal.

In this case, the sending unit 610 in the apparatus 600 shown in FIG. 10 may correspond to the transmitter 740 in the terminal device 700 shown in FIG. 11 (the correspondence may be understood as that the sending unit 610 and the transmitter 740 can perform same or similar steps and have same or similar functions), and the receiving unit 620 in the apparatus 600 shown in FIG. 10 may also correspond to the receiver 730 in the terminal device 700 shown in FIG. 11. In another implementation, the transmitter 740 and the receiver 730 may be implemented by a same component, namely, a transceiver.

In an embodiment, the apparatus 600 may be a chip (or a chip system) installed in the first terminal device. In this case, the apparatus 600 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit 610 in the apparatus 600 shown in FIG. 10 may correspond to the output interface, and the receiving unit 620 in the apparatus 600 shown in FIG. 10 may correspond to the input interface.

Figure 12:
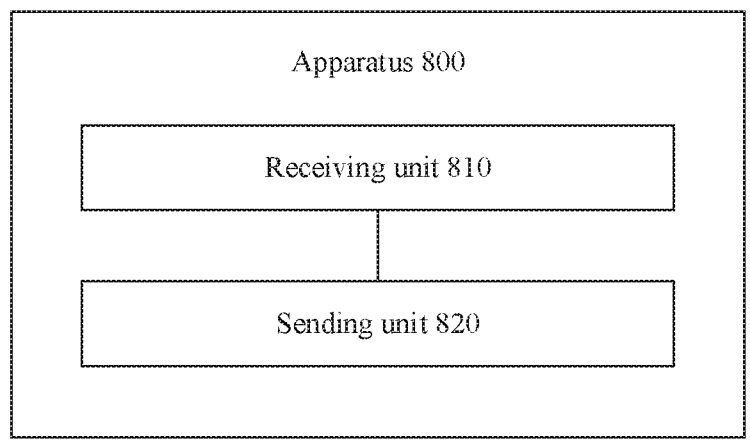
FIG. 12 is a schematic block diagram of a data transmission apparatus 800 according to an embodiment of this application.

FIG. 12 is a schematic block diagram of a data transmission apparatus 800 according to an embodiment of this application. As shown in FIG. 12, the apparatus 800 includes:

a receiving unit 810, configured to receive first indication information sent by a network device, where the first indication information is used to indicate a first target transmission resource, the first target transmission resource includes periodic data transmission resources and periodic authorization transmission resources that are preconfigured by the network device for a first terminal device, the periodic data transmission resources correspond to the periodic authorization transmission resources, the periodic data transmission resources are used to transmit uplink data sent by the first terminal device, the periodic authorization transmission resources are used to transmit authorization response information, and the authorization response information is used to indicate a data transmission resource that the first terminal device can use; and a sending unit 820, configured to: when the receiving unit 810 does not detect the authorization response information on a second authorization transmission resource in the periodic authorization transmission resources, send uplink data on a second data transmission resource corresponding to the second authorization transmission resource; or when the second terminal device detects that authorization response information on a second authorization transmission resource in the periodic authorization transmission resources, prohibit sending uplink data on a second data transmission resource corresponding to the second authorization transmission resource.

Therefore, the periodic authorization transmission resources and the periodic data transmission resources are informed to another terminal device (for example, the apparatus) by using the first indication information, so that the apparatus can detect whether the authorization transmission resource carries the authorization response information, to determine, based on correspondences between the periodic authorization transmission resources and the periodic data transmission resources, whether the apparatus can use the corresponding data transmission resource. In addition, when detecting that an authorization transmission resource (for example, the second authorization transmission resource) does not carry the authorization response information, the apparatus may determine that the first terminal device does not use the data transmission resource corresponding to the second authorization transmission resource. In this case, the apparatus may send its uplink data on the data transmission resource corresponding to the second authorization transmission resource, so that the periodic data transmission resources are fully utilized, and resource utilization is effectively improved.

The data transmission apparatus 800 may correspond to the second terminal device described in the method 300 (for example, may be configured in the second terminal device or may be the second terminal device), and modules or units in the data transmission apparatus 800 are respectively used to perform actions or processing processes performed by the second terminal device in the method 300. To avoid repetition, details are not described herein.

Figure 13:
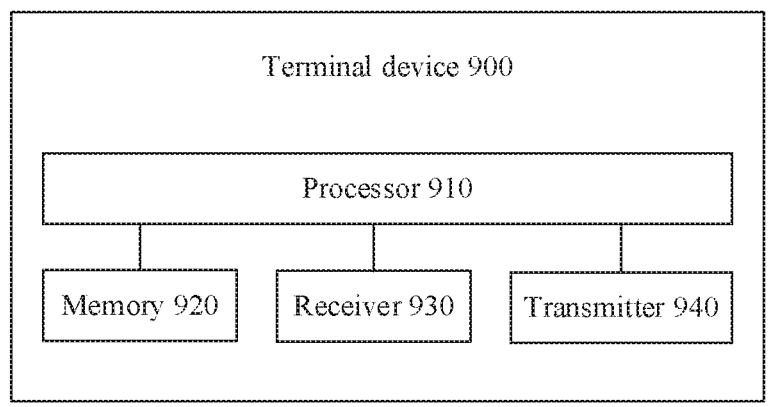
FIG. 13 is a schematic structural diagram of a data transmission terminal device 900 according to an embodiment of this application.

In this embodiment of this application, the apparatus 800 may be the second terminal device. FIG. 13 is a schematic structural diagram of a data transmission terminal device 900 according to an embodiment of this application. As shown in FIG. 13, the terminal device 900 may include a processor 910, a transmitter 940, and a receiver 930. The processor 910, the transmitter 940, and the receiver 930 are communicatively connected. Optionally, the terminal device 900 further includes a memory 920, and the memory 920 is communicatively connected to the processor 910. Optionally, the processor 910, the memory 920, the transmitter 940, and the receiver 930 may be communicatively connected. The memory 920 may be configured to store an instruction. The processor 910 is configured to execute the instruction stored in the memory, to control the transmitter 940 to send information or control the receiver 930 to receive a signal.

In this case, the receiving unit 810 in the apparatus 800 shown in FIG. 12 may correspond to the receiver 930 in the terminal device 900 shown in FIG. 13, and the sending unit 820 in the apparatus 800 shown in FIG. 12 may correspond to the transmitter 940 in the terminal device 900 shown in FIG. 13. In another implementation, the transmitter 940 and the receiver 930 may be implemented by a same component, namely, a transceiver.

In this embodiment of this application, the apparatus 800 may be a chip (or a chip system) installed in the second terminal device. In this case, the apparatus 800 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 810 in the apparatus 800 shown in FIG. 12 may correspond to the input interface, and the sending unit 820 in the apparatus 800 shown in FIG. 12 may correspond to the output interface.

It should be noted that the foregoing method embodiments in the embodiments of this application may be applied to a processor, or be implemented by a processor. The processor may be an integrated circuit chip and has a signal processing capability. In an implementation process, the steps in the foregoing method embodiments may be implemented by using a hardware integrated logical circuit in the processor or instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, or an electrically erasable programmable memory. The storage medium is located in the memory, and the processor reads information from the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. Through example but not limitative description, many forms of RAMs may be used, for example, a static random access memory (Static RAM, SRAM), a dynamic random access memory (Dynamic RAM. DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these types of memories and any memory of another proper type.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method implemented by a first terminal device, the data transmission method comprising:
   sending first request information to a network device on a first request transmission resource, wherein the first request information requests to use a first data transmission resource, wherein the first data transmission resource belongs to periodic data transmission resources preconfigured by the network device for the first terminal device, wherein the periodic data transmission resources communicate uplink data, wherein the first request transmission resource belongs to periodic request transmission resources preconfigured by the network device for the first terminal device, and wherein the periodic request transmission resources communicate request information;
   receiving first authorization response information from the network device on a first authorization transmission resource, wherein the first authorization response information indicates that the first terminal device is permitted to use the first data transmission resource, wherein the first authorization transmission resource belongs to periodic authorization transmission resources preconfigured by the network device for the first terminal device, and wherein the periodic authorization transmission resources communicate authorization response information;
   sending the uplink data on the first data transmission resource;
   receiving acknowledgement information from the network device on a second authorization transmission resource in the periodic authorization transmission resources, wherein the acknowledgement information indicates when the network device receives the uplink data; and determining, by the first terminal device based on the acknowledgement information, whether the uplink data is received by the network device.

2. The data transmission method of claim 1, wherein the first request transmission resource is in an $n^{th}$ period of periodic transmission resources preconfigured by the network device for the first terminal device, wherein the first authorization transmission resource is in an $(n+k)^{th}$ period of the periodic transmission resources, wherein the first data transmission resource is in an $(n+k+t)^{th}$ period of the periodic transmission resources, wherein each period of the periodic transmission resources comprises one request transmission resource, one authorization transmission resource, and one data transmission resource, wherein n is an integer greater than zero, and wherein k and t are both integers greater than or equal to zero.

3. The data transmission method of claim 2, wherein a duration of the period of the periodic transmission resources is one slot.

4. The data transmission method of claim 2, wherein
k is one and t is zero;
k and t are both one; or
k and t are both two.

5. The data transmission method of claim 1, wherein the first request information and the first authorization response information are both one bit.

6. A data transmission apparatus, comprising:
a processor configured to:
preconfigure periodic data transmission resources for a first terminal device to communicate uplink data;
preconfigure periodic request transmission resources for the first terminal device to communicate request information; and
preconfigure periodic authorization transmission resources for the first terminal device to communicate authorization response information;
a receiver coupled to the processor and configured to receive first request information from the first terminal device on a first request transmission resource, wherein the first request information requests to use a first data transmission resource, wherein the first data transmission resource belongs to the periodic data transmission resources, and wherein the first request transmission resource belongs to the periodic request transmission resources; and
a transmitter coupled to the processor and the receiver and configured to send first authorization response information to the first terminal device on a first authorization transmission resource, wherein the first authorization response information indicates that the first terminal device is permitted to use the first data transmission resource, wherein the first authorization transmission resource belongs to the periodic authorization transmission resources,
wherein the receiver is further configured to receive first uplink data from the first terminal device on the first data transmission resource,
wherein after receiving the first uplink data, the transmitter is further configured to send acknowledgement information on a fourth authorization transmission resource in the periodic authorization transmission resources, wherein the acknowledgement information indicates whether the data transmission apparatus receives the first uplink data from the first terminal device.

7. The data transmission apparatus of claim 6, wherein the transmitter is further configured to send first indication information to a second terminal device, wherein the first indication information indicates a first target transmission resource, wherein the first target transmission resource comprises the periodic data transmission resources and the periodic authorization transmission resources, wherein the receiver is further configured to receive second uplink data from the second terminal device on a second data transmission resource, wherein the second data transmission resource belongs to the periodic data transmission resources, wherein the second data transmission resource corresponds to a second authorization transmission resource in the periodic authorization transmission resources, and wherein the transmitter does not send the authorization response information on the second authorization transmission resource.

8. The data transmission apparatus of claim 6, wherein a time segment corresponding to the first request transmission resource belongs to a first time segment, wherein a time segment corresponding to the first authorization transmission resource belongs to a second time segment, wherein the receiver is further configured to receive the first request information from the first terminal device in the first time segment, wherein the transmitter is further configured to send the first authorization response information to the first terminal device in the second time segment, wherein the receiver is further configured to receive second request information from a third terminal device in the first time segment, wherein the first request information and the second request information both request the first data transmission resource, wherein the processor is further configured to preconfigure second periodic data transmission resources for the third terminal device, wherein the second periodic data transmission resources are same as the periodic data transmission resources, wherein the transmitter is further configured to send second authorization response information to the third terminal device in a third time segment to which a time segment corresponding to a third authorization transmission resource belongs, wherein the second authorization response information indicates that the third terminal device is permitted to use a third data transmission resource corresponding to the third authorization transmission resource, wherein the third authorization transmission resource belongs to periodic authorization transmission resources preconfigured by a network device for the data transmission apparatus, wherein the third data transmission resource belongs to the second periodic data transmission resources, and wherein the receiver is further configured to receive third uplink data from the third terminal device on the third data transmission resource.

9. The data transmission apparatus of claim 6, wherein the processor is further configured to preconfigure periodic transmission resources for the first terminal device, wherein the first request transmission resource is in an $n^{th}$ period of the periodic transmission resources, wherein the first authorization transmission resource is in an $(n+k)^{th}$ period of the periodic transmission resources, wherein the first data transmission resource is in an $(n+k+t)^{th}$ period of the periodic transmission resources, wherein each period of the periodic transmission resources comprises one request transmission resource, one authorization transmission resource, and one data transmission resource, wherein n is an integer greater than zero, and wherein k and t are both integers greater than or equal to zero.

10. The data transmission apparatus of claim 9, wherein a duration of the period of the periodic transmission resources is one slot.

11. The data transmission apparatus of claim 9, wherein:
k is one and t is zero;
k and t are both one; or
k and t are both two.

12. The data transmission apparatus of claim 6, wherein the first request information and the first authorization response information are both one bit.

13. The data transmission apparatus of claim 6, wherein the transmitter is further configured to send second indication information to the first terminal device, wherein the second indication information indicates a second target transmission resource, and wherein the second target transmission resource comprises the periodic request transmission resources, the periodic authorization transmission resources, and the periodic data transmission resources.

14. A data transmission apparatus, wherein the data transmission apparatus is a first terminal device, and wherein the data transmission apparatus comprises:
a transmitter configured to send first request information to a network device on a first request transmission resource, wherein the first request information requests to use a first data transmission resource, wherein the first data transmission resource belongs to periodic data transmission resources preconfigured by the network device for the first terminal device, wherein the periodic data transmission resources communicate uplink data, wherein the first request transmission resource belongs to periodic request transmission resources preconfigured by the network device for the first terminal device, and wherein the periodic request transmission resources communicate request information; and
a receiver coupled to the transmitter and configured to receive first authorization response information from the network device on a first authorization transmission resource, wherein the first authorization response information indicates that the first terminal device is permitted to use the first data transmission resource, wherein the first authorization transmission resource belongs to periodic authorization transmission resources preconfigured by the network device for the first terminal device, wherein the periodic authorization transmission resources communicate authorization response information,
wherein the transmitter is further configured to send the uplink data on the first data transmission resource,
wherein after sending the uplink data, the receiver is further configured to receive acknowledgement information from the network device on a second authorization transmission resource in the periodic authorization transmission resources, wherein the acknowledgement information indicates when the network device receives the uplink data, and wherein the data transmission apparatus further comprises a processor coupled to the transmitter and the receiver and configured to determine, based on the acknowledgement information, whether the uplink data is received by the network device.

15. The data transmission apparatus of claim 14, wherein the first request transmission resource is in an $n^{th}$ period of periodic transmission resources preconfigured by the network device for the first terminal device, wherein the first authorization transmission resource is in an $(n+k)^{th}$ period of the periodic transmission resources, wherein the first data transmission resource is in an $(n+k+t)^{th}$ period of the periodic transmission resources, wherein each period of the periodic transmission resources comprises one request transmission resource, one authorization transmission resource, and one data transmission resource, wherein n is an integer greater than zero, and wherein k and t are both integers greater than or equal to zero.

16. The data transmission apparatus of claim 15, wherein duration of the period of the periodic transmission resources is one slot.

17. The data transmission apparatus of claim 15, wherein:
k is one and t is zero;
k and t are both one; or
k and t are both two.

18. The data transmission apparatus of claim 14, wherein the first request information and the first authorization response information are both one bit.

19. The data transmission apparatus of claim 14, wherein the receiver is further configured to receive indication information from the network device, wherein the indication information indicates a target transmission resource, and wherein the target transmission resource comprises the periodic request transmission resources, the periodic authorization transmission resources, and the periodic data transmission resources.

* * * * *